United States Patent
Voss

[19]

[11] Patent Number: 5,409,311
[45] Date of Patent: Apr. 25, 1995

[54] DEVICE FOR THE PRODUCTION OF MEDIUM-VISCOUS OR MORE HIGHLY VISCOUS DUAL-COMPONENT OF MULTI-COMPONENT COMPOUNDS BY INTERMIXING THE COMPONENTS

[75] Inventor: Klaus W. Voss, Uetersen, Germany

[73] Assignee: Vosschemie GmbH, Uetersen, Germany

[21] Appl. No.: 62,681

[22] Filed: May 17, 1993

Related U.S. Application Data

[63] Continuation of Ser. No. 555,716, Jul. 19, 1990, abandoned.

Foreign Application Priority Data

Jun. 25, 1990 [EP]  European Pat. Off. ............ 90112000

[51] Int. Cl.⁶ ........................................... B01F 13/06
[52] U.S. Cl. ................................. 366/139; 366/276; 366/314; 366/315; 366/181.8
[58] Field of Search .............. 366/139, 163, 164, 279, 366/302, 304, 305, 306, 309, 311, 312, 313, 224, 315, 55, 56, 62, 63, 221, 220, 150, 152, 160, 162, 177, 182, 276; 141/263, 284; 222/137, 482

References Cited

U.S. PATENT DOCUMENTS

| | | | |
|---|---|---|---|
| 1,326,628 | 12/1919 | Anderson | 366/312 |
| 1,345,542 | 7/1920 | Hartshorn | 366/311 |
| 2,295,136 | 9/1942 | Stiers | 366/311 |
| 2,453,914 | 11/1948 | Hollenback | 366/139 |
| 3,131,912 | 5/1964 | Steinbock | 366/139 |
| 3,227,166 | 2/1966 | Martz | 366/279 |
| 3,266,781 | 8/1966 | Eppenberger | 366/312 |
| 3,938,787 | 2/1976 | Bobylev | 366/224 |
| 3,942,771 | 3/1976 | Knutsen | 366/309 |
| 4,104,737 | 8/1978 | Brailsford | 366/312 |
| 4,148,588 | 4/1979 | Kanda et al. | 366/56 |
| 4,175,869 | 11/1979 | Churlaud | 366/309 |
| 4,378,075 | 3/1983 | Voss et al. | 222/137 |
| 4,479,590 | 10/1984 | Slautterback | 366/279 |
| 4,506,984 | 3/1985 | Strehlow | 366/309 |
| 4,611,922 | 9/1986 | Eirich | 366/311 |
| 4,653,568 | 3/1987 | Baldelli | 366/139 |
| 4,772,434 | 9/1988 | Myers | 366/224 |
| 4,826,325 | 5/1989 | Iwata et al. | 366/314 |
| 4,893,939 | 1/1990 | Burk et al. | 366/309 |
| 5,005,612 | 4/1991 | Kurtz | 366/309 |

FOREIGN PATENT DOCUMENTS

| | | | |
|---|---|---|---|
| 2443872 | 8/1980 | France | 366/279 |
| 0829453 | 1/1952 | Germany | 366/312 |
| 3022689 | 12/1981 | Germany | 366/302 |
| 1235028 | 6/1971 | United Kingdom | 366/224 |

*Primary Examiner*—David A. Scherbel
*Assistant Examiner*—Tony G. Soohoo
*Attorney, Agent, or Firm*—Anderson Kill Olick & Oshinsky

[57] ABSTRACT

The device (10) for the intermixing of two components, such as synthetic compound and hardener, for the production of a dual or multi-component compound, such as filler for repair work on sheet metal is comprised of an evacuable mixing container (50) which can be opened at the top, in the mixing chamber (20) of which a rotatingly driven mixing disk (30) that is removable from the mixing container (50) and a vane-like (41) mixing member (40) are disposed, which, as compared to the rotating mixing disk (30), is vertically and stationarily arranged in the mixing chamber and, with the aid of a driving means (149), is alternately swivelable about its vertical shaft (49) by small angular values, while the cover portion (54) of the mixing container (50), while in the operative position, is retained by means of a vacuum on the circumferential rim of the container side wall (52) (FIG. 1).

29 Claims, 17 Drawing Sheets

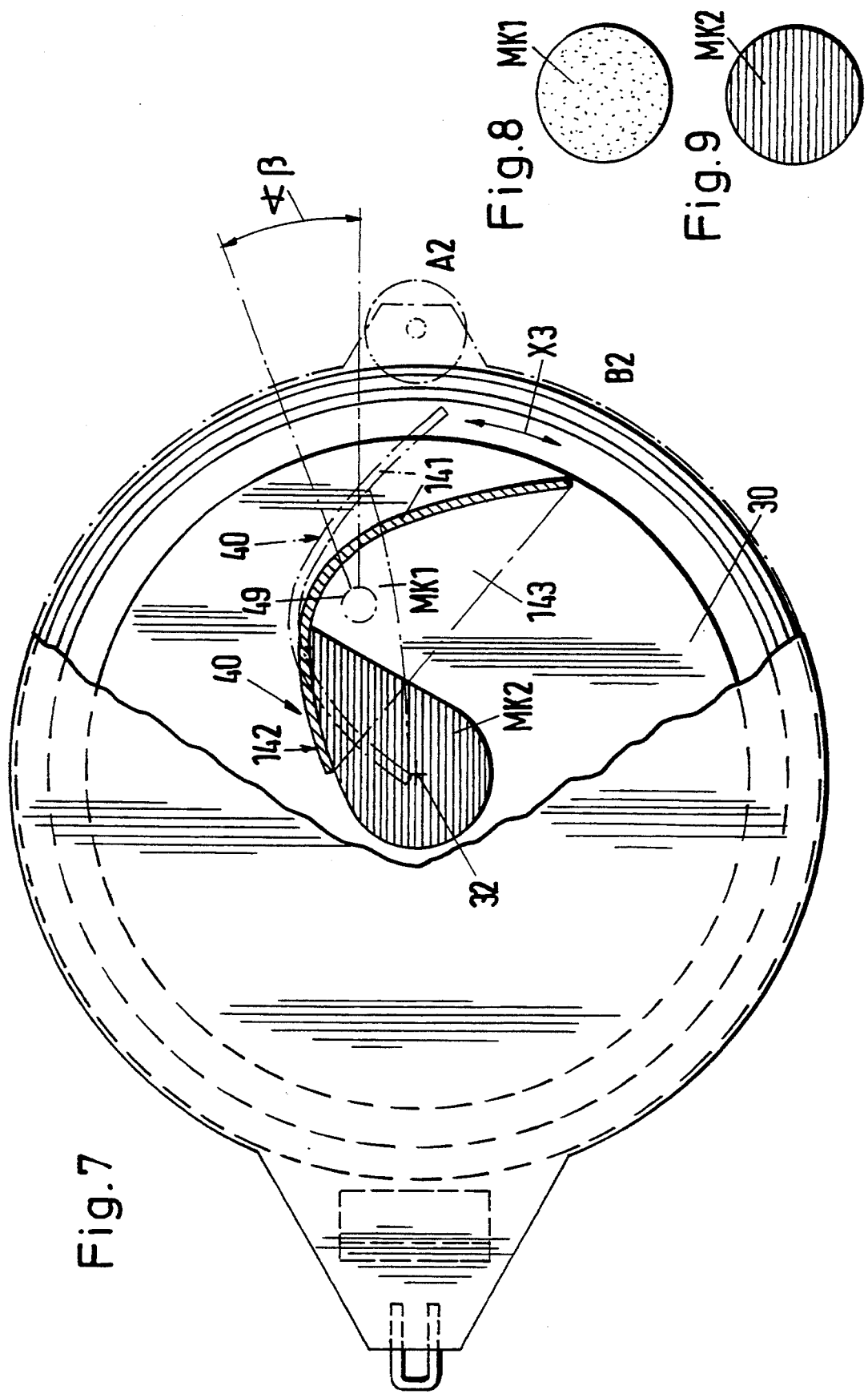

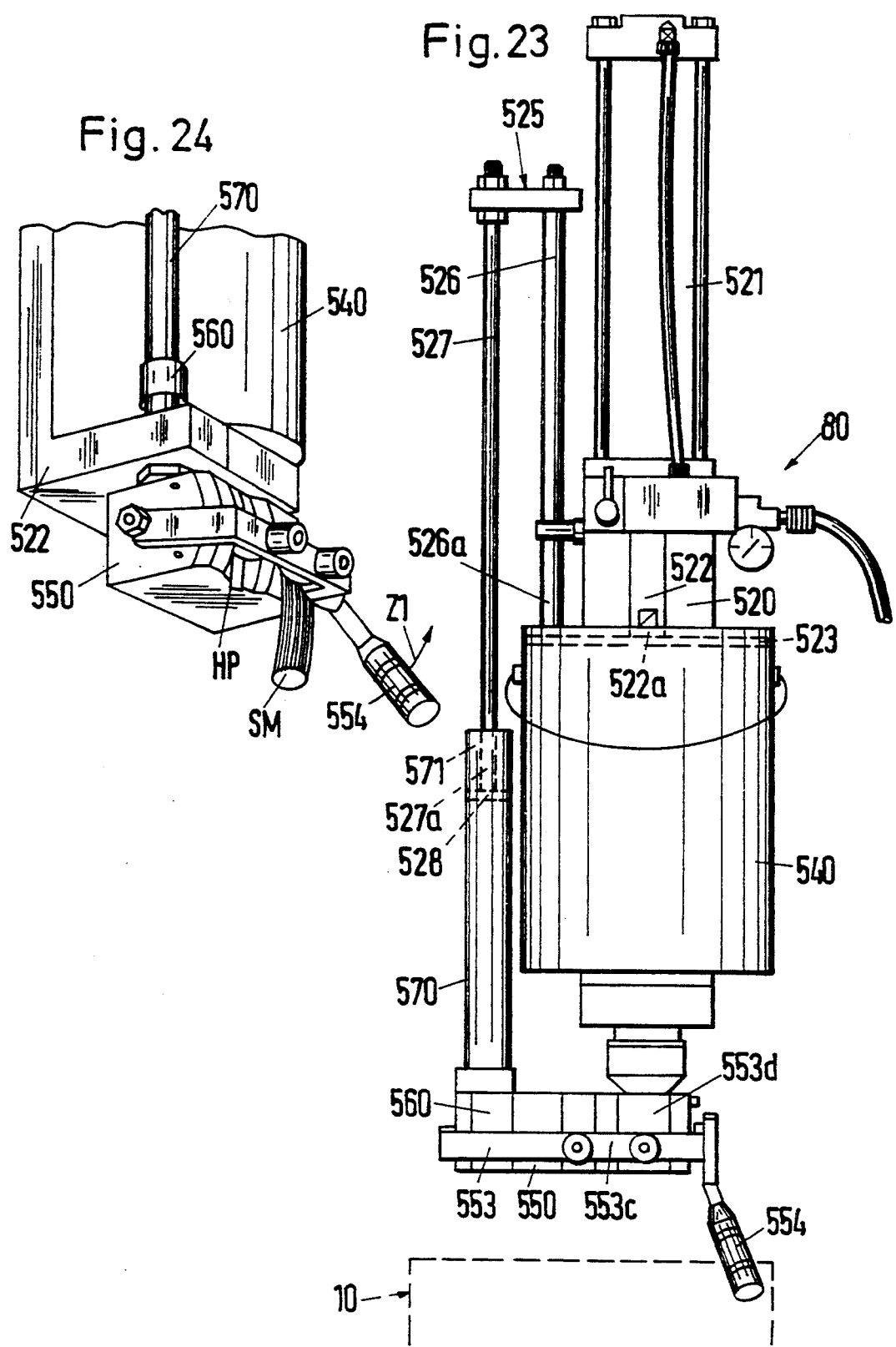

DEVICE FOR THE PRODUCTION OF MEDIUM-VISCOUS OR MORE HIGHLY VISCOUS DUAL-COMPONENT OF MULTI-COMPONENT COMPOUNDS BY INTERMIXING THE COMPONENTS

This is a continuation of application Ser. No. 07/555,716, filed Jul. 19, 1990, now abandoned.

FIELD OF THE INVENTION

The present invention relates to a method and a device for the production of in particular small quantities of medium-viscous or more highly viscous dual or multi-component compounds by intermixing the components.

BACKGROUND OF THE INVENTION

Methods for the mixing of medium-viscous or more highly viscous compounds are known. In repairs of automobile body sheet, in the workshops, e.g. polyester fillers are employed for evening out unevennesses or irregularities in the sheets subsequent to the same having suffered damage in accidents or in order to carry out other sheet metal repairs.

As is well-known, these polyester fillers are manually mixed with paste-like and, in most cases, dyed hardener. In this case, the mixing is performed on a flat plate with the aid of a spatula or a wooden paddle. In the manual mixing operation with the customary quantity of 2 thru 3% of hardener compound, due to the high viscosity of the filler, additional air is automatically supplied to this pasty compound. These air bubbles are again dispersed in intensive agitation. Subsequent to the hardening of the thusly mixed filler which is then applied to the automobile body sheet, the same is once more ground over so as to even out the surface and to adapt the outline to the sheet surface. In the course of these grinding operations, small air bubbles are exposed time and time again. Said air bubbles almost always present in the fillers do represent a serious quality-related problem for an automobile paint workshop. Particularly those air bubbles which are located only a slight distance below the surface and which have not yet become visible by partial grinding, have to be designated as insidious because, after the spray painting, the vehicle is heated to 80° C. with the consequence that the air inside said bubbles expands very considerably, whereby flaws on the paint surface are produced. After having cooled down, the air contracts again and may result in a further flaw or imperfection. Fillers that are mixed in the presence of a solvent are subject to the disadvantage that solvent fumes are released to which the paint shop worker is exposed and are inhaled by him.

The invention is based upon the technical problem of providing a method, with the aid of which pasty and highly viscous fillers, in particular polyester fillers in accordance with the type described in the beginning, are mechanically blended with hardener in small quantities in such a way that an air bubble-free and immediately workable filler is obtained, which, even after subsequent grinding treatment, does not result in any flaws being produced in the surfaces of the sheet metal parts to which the filler has been applied, in which process a minimum of contamination of the mixing tools is intended to take place and a complicated expensive cleaning of the mixing implements is avoided, while, furthermore, a handy device is made available to the paint shop worker, with the aid of which an automatic and mechanical mixing of fillers containing hardener, more particularly polyester fillers, with hardener is possible and this in quantities desired in each case by the paint shop worker for the requirements that occur at the particular moment.

This technical problem is solved by the method claims characterized in the claims 1 thru 3.

A first solution consists in that a predetermined quantity of the components to be intermixed, such as hardener and synthetic compound, is mixed on a moving mixing surface disposed in a closed, evacuable mixing chamber with a guide vane-like mixing member that is stationary relative to the moved mixing surface and which is vertically disposed on said surface and comprised of a rectangular or curved shaped member forming a boundary wall with an opening facing the direction of movement of the moved surface. While, due to the rolling of the approximately cylindrical or fusiform mixture composition issuing from the center of the moved mixing surface the composition is formed on the mixing disk and on the vertical boundary wall of the mixing member with the simultaneous elimination of the air bubbles present in the filler and supplied by the migration or flow process to the filler body surface by their enlargement and bursting open due to the air being evacuated from the mixing chamber by means of circulation and shifting, the rolling and thrusting motions of the mixture composition and its translatory movement being controlled with the aid of the mixing member, in this case the mixing chamber being ventilated after the termination of the mixing operation.

While this method is based on the circumstance that the moved mixing surface travels toward a stationary mixing member, a further solution consists in that a predetermined total quantity of the compound to be intermixed, such as synthetic filler and hardener, is mixed on a stationarily disposed, horizontal mixing surface in a closed, evacuable mixing chamber with a guide vane-like mixing member arranged vertically on said surface and, in relation to the stationary mixing surface, rotatingly driven about the center of the latter and which is comprised of a rectangular or curved shaped member forming a boundary wall with an opening located in the direction of rotation. By the rolling of the approximately cylindrical or fusiform mixture composition issuing or originating from the center of the mixing surface, said mixture composition is formed on the mixing surface and on the vertical boundary wall of the rotating mixing member with the simultaneous elimination of the air bubbles present in the filler and supplied by the migration or flow process to the filler body surface by their enlargement and bursting open due to the air being evacuated from the mixing chamber by means of circulation and displacement, the rolling and thrusting motions of the mixing member and its translatory movement being controlled with the aid of the mixing member, in this case the mixing chamber is ventilated after the termination of the mixing operation.

According to this method, the rotatingly driven mixing member travels toward the stationary mixing surface.

A third solution consists in that a predetermined total quantity of the components to be intermixed, such as synthetic filler and hardener, is mixed on a moving mixing surface disposed in a closed, evacuable mixing chamber with a guide vane-like mixing member arranged vertically on said mixing surface and driven counterrotatingly relative to the direction of movement of the mixing surface about the center of the latter, which is comprised of a rectangular or curved shaped member forming a boundary wall with an aperture located in the direction of rotation. While, due to the rolling of the approximately cylindrical or fusiform mixture composition issuing from the center of the mixing surface, said mixture composition is formed on the mixing surface and on the vertical boundary wall of the rotating mixing member with the simultaneous elimination of the air bubbles present in the filler and supplied by the migration or flow process to the filler body surface by their enlargement and bursting open due to the air being evacuated from the mixing chamber by means of circulation and displacement. The rolling and thrusting motions of the mixing member and its translatory movement is being controlled with the aid of the mixing member, in this case the mixture chamber is ventilated after the termination of the mixing operation.

According to this method, the rotatingly driven mixing member travels toward the stationary mixing surface.

A third solution consists in that a predetermined total quantity of the components to be intermixed, such as hardener and synthetic compound, is intermixed on a moving mixing surface disposed in a closed, evacuable mixing chamber with a guide vane-like mixing member arranged vertically on said mixing surface and driven counterrotatingly relative to the direction of movement of the mixing surface about the center of the latter, which is comprised of a rectangular or curved shaped member forming a boundary wall with an opening that faces the direction of movement of the mixing surface. While, due to the rolling of the approximately cylindrical or fusiform mixture composition issuing from the center of the mixing surface, said mixture composition is formed on the mixing surface and on the vertical boundary wall of the rotating mixing member with the simultaneous elimination of the air bubbles present in the filler and supplied by the migration or flow process to the filler body surface by their enlargement, bursting open due to the air being evacuated from the mixing chamber by means of circulation and displacement. The rolling and thrusting motions of the mixing member and its translatory movement is controlled with the aid of the mixing member, in this case, the mixing chamber is ventilated after the termination of the mixing operation.

According to this method, the moving mixing surface is made to travel contrary to the mixing member, which likewise rotates contrary to the direction of movement of the mixing surface.

In those cases where the mixing surface is moved contrary to the mixing member, the mixing surface is constructed in the form of a horizontal mixing disk driven rotatingly about its center shaft.

In addition, the technical problem is solved by three differently constructed devices, in which connection the device for the method in which the mixing surface travels contrary to the mixing member, is constructed in such a way that it is comprised of a mixing container having a square or circular cross-section, of a bottom portion, of a circumferential side wall and of a cover portion which seals the upper container opening. The cover portion is secured to the container side wall with the aid of mechanical means or by means of a vacuum in the operative state of the device, of a horizontal mixing disk disposed in the mixing chamber of the mixing container. The mixing disk supported on the bottom portion and rotatingly driven about its vertical center axis with the aid of a driving means arranged on the bottom portion and of a mixing member stationarily disposed above the mixing disk opposite the same. The mixing member is constructed in the form of a shaped member disposed in the mixing chamber vertical relative to the mixing disk in the form of a rectangular or curved boundary wall having the function of a mixing vane and with an opening facing the direction of rotation of the mixing disk, the mixing disk is detachably connected to the drive shaft of the driving means and the mixing container being provided with a connecting piece disposed in the container wall which communicates with a vacuum generating unit.

The device for performing the method, according to which the mixing member is moved rotatingly toward the stationary mixing surface, is comprised of a mixing container having a square or circular cross-section, of a bottom portion, of a circumferential side wall and of a cover portion closing the upper container opening which, with the aid of mechanical means or by means of a vacuum, is secured to the container side wall in the operative state of the device, of a horizontal mixing disk disposed in the mixing chamber of the mixing container. The mixing disk is detachably supported on the bottom portion, and of a mixing member disposed above the stationary disk opposite the same and rotatingly driven about a vertical shaft with the aid of a driving means, said mixing member being constructed in the form of a shaped member disposed in the mixing chamber vertically relative to the mixing disk in the form of a rectangular or curved boundary wall having the function of a mixing vane and with an opening facing the mixing disk, in which the mixing container is provided with a connection piece disposed in the container wall which is connected to a vacuum generating unit.

For the method in which both the mixing surface as well as the mixing member are moved toward each other, a device is provided that is comprised of a mixing container having a square or circular cross-section, of a bottom portion, of a circumferential side wall and of a cover portion closing the upper container aperture which, with the aid of mechanical means or by means of a vacuum, is secured to the container side wall in the operative state of the device, of a horizontal mixing disk disposed in the mixing chamber of the mixing container, said mixing disk being supported on the bottom portion, it being rotatingly driven about its vertical center shaft with the aid of a driving means mounted on the bottom portion, and of a mixing member disposed above the rotatingly driven mixing disk opposite the same about a vertical shaft with the aid of a drive means, and of a mixing member above the rotatingly driven mixing disk which, in relation to the latter, is, with the aid of a driving means, counterrrotatingly driven relative to the direction of rotation of the mixing disk about a vertical shaft, said mixing member being constructed in the form of a shaped member disposed in the mixing chamber vertically relative to the mixing disk in the form of a rectangular or curved boundary wall having the function of a mixing vane and with an opening facing the direction of rotation of the mixing disk, in which the mixing disk is detachably coupled to the drive shaft of the driving means, while the mixing container is provided with a connecting piece that communicates with a vacuum generating unit.

With this method and the device designed for its performance, an automatic mechanical intermixing of fillers and hardeners, particularly in the quantities required in each case by the paint shop worker, which may be small or large and which depend in each case on the size of the areas to which filler is to be applied, in which connection larger areas are treated section-wise, is possible. Moreover, the filler produced is workable immediately. A refilling onto a working plate is dispensed with since the mixing plate of the mixing device with the filler mixed thereupon can be removed and brought within the area of the surfaces on which it is to be applied. The automatic mixing is thus effected in a closed mixing chamber which is evacuated during the mixing operation. In the course of this mixing operation, it is evacuated by approximately 90% to 100 mb by means of a vacuum pump. If necessary, solvent fumes produced during the mixing operation are drawn off along with the air at the same time so that the paint shop worker is not exposed to solvent fumes. A consequence of this is that the air pockets present in the mixing compound, viz. air bubbles, are enlarged to the ninefold of their volume and, during the mixing operation, moved to the surface of the mixture composition. Due to their size, burst on the surface of the mixture composition, i.e. the filler. Owing to the circumstance that the mixing of the components, one of which is a hardener, is effected in a vacuum and on a mixing disk in connection with a specially designed mixing member. Meanwhile the mixture body, due to the motion cycles of the mixing disk and/or the mixing member, besides a rotating motion, also executes a transversal movement, the filler is rendered free of air bubbles during the mixing operation. In this connection, the mixing operation is planned in such way that the intermixing can preferably be performed within 15 to 50 seconds. The thusly obtained air bubble-free filler is then applied to the automobile body sheet surface by means of a spatula. The filler is gelled (hardened) after 4 to 5 minutes so that the grinding operation can be carried out after a further 15 minutes. The grinding operations performed now no longer show any air bubble inclusions so that, with this method and the devices and means constructed for them, a significant quality enhancement in the automobile body repair and painting trade is achieved.

This movement of the air bubbles toward the surface of the mixture composition is, apart from the evacuation of the mixing chamber, accomplished by the rolling and shifting movement of the filler. By means of the movement of the composition achieved in this case, the air bubbles are displaced to the surface. Also small air bubbles with lacking buoyant force are conveyed to the surface. Owing to the various kinetic cycles of the mixing disk and the mixing member, a complete and thorough intermixing of the filler components is achieved within a minimum of space since, due to the vane-like construction of the mixing member with a lateral reception space for the mixed product, product laterally, is limited only by the vertical boundary wall of the mixing member and, at the bottom, by the mixing disk, the filler components stay on a spot on the mixing disk that is predetermined by the position of the mixing member during the mixing operation and this spot on the mixing disk can be changed uniquely by altering the position of the mixing member, an optimal thorough blending is ensured at all times. The intensive intermixing of the filler components is also additionally achieved by a constant change of the shape of the mixture composition due to the circumstance that the setting angle of the mixing member relative to the mixing disk is changed.

By an alternate reciprocal swiveling of the mixing member the mixture composition assumes a continually changing shape during the mixing operation. This perpetual changing of the configuration of the mixture composition, together with the rolling motions of the mixture composition between the mixing disk and the mixing member contributes to the filler components being vigorously intermixed so that, in connection with the evacuation of the mixing chamber, even if highly viscous compounds are involved, a movement of the air bubbles from the interior of the compound to its surface is brought about. The swivel motions of the mixing member are in this case executed only within a small area. This area is adjusted in such a way that, during the mixing operation, no mixing compound is able to migrate from the area of the mixing disk. The mixing member may be swiveled manually, electromotively or electromagnetically. The central point of the mixture composition is subject to a constant movement since, in dependence of the movement of the mixing member, it moves constantly, as a result of which the hardener travels through the entire filler.

Furthermore, only those parts of the mixing device that come into direct contact with the filler are contaminated by the same and, since only a few parts, viz. mixing member and mixing disk, do come into contact with the filler. A cleaning of said parts subsequent to the termination of the mixing operation is easy and in no way expensive. If the mixing disk and the mixing member are fabricated from a highly polished plastic, such as polyethylene, polyurethane or tetrafluorocarbon, in that case a removal of remainders of gelled filler is readily effected.

Besides fillers which contain solvents, it is also possible to mix fillers that are solvent-free with equally satisfactory results, particularly when dyeing has to be carried out. Apart from silicon rubber, polyurethane fillers, epoxide fillers, fillers and putties, all components, and this in the smallest quantities, can be intermixed. For the paint shop worker, the mixing disk itself forms the transporting means for the finished filler.

Once the mixing operation is terminated, the mixing chamber ventilated and the mixing container opened, then the mixing disk or the mixing plate lying on the mixing disk is removed from the mixing chamber and the mixing product obtained (filler) is applied directly to the surface to be treated, e.g. the automobile body sheet surface, on which the filler then gels (hardens).

BRIEF DESCRIPTION OF THE DRAWINGS

Advantageous constructions of the invention are characterized in the subclaims. In the drawings.

FIG. 7 shows, in a view from the top, a further embodiment of a curved mixing member disposed on the mixing disk in a horizontal section in various swivel positions and with different configurations of the mixture composition obtained by the swivel positions;

FIGS. 8 and 9 show characterizations of the filler exhibiting different configurations in the different swivel positions of the mixing members in FIG. 7;

FIG. 23 shows, in a front view, the dispensing means for synthetic filler and hardener;

FIG. 24 shows, in a diagrammatical view, the lower area of the dispensing means with the filling head;

DETAILED DESCRIPTION OF THE PREFERRED EMBODIMENT

Figure 1:
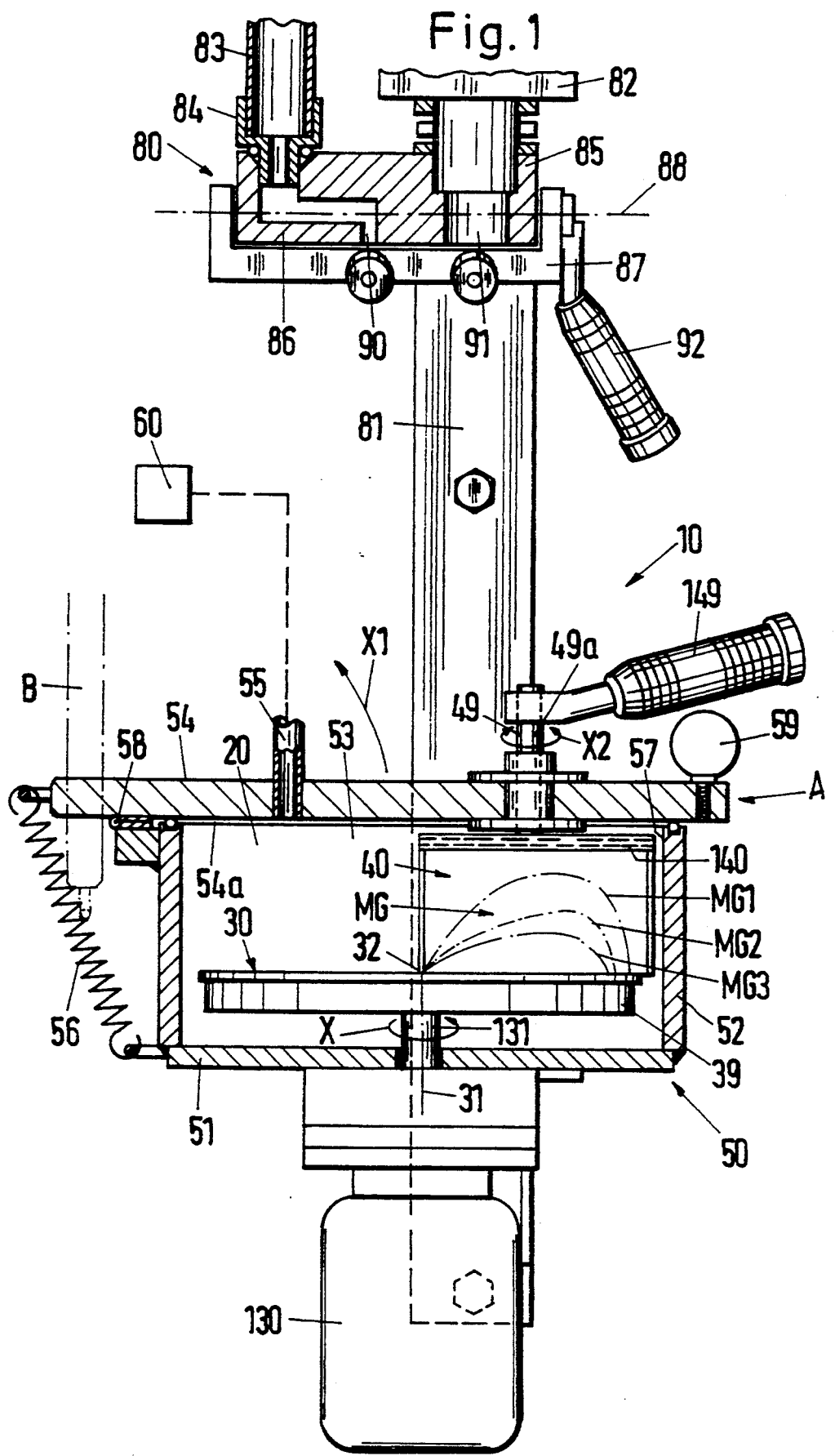
FIG. 1 shows, partly in a view and partly in a vertical section, a mixing device allocated to a means for the simultaneous and metered dispensing of fillers and hardener pastes for intermixing fillers with a hardener while making use of a rotatingly driven mixing disk and of a stationary, guide vane-like mixing member allocated to the latter.
Figure 2:
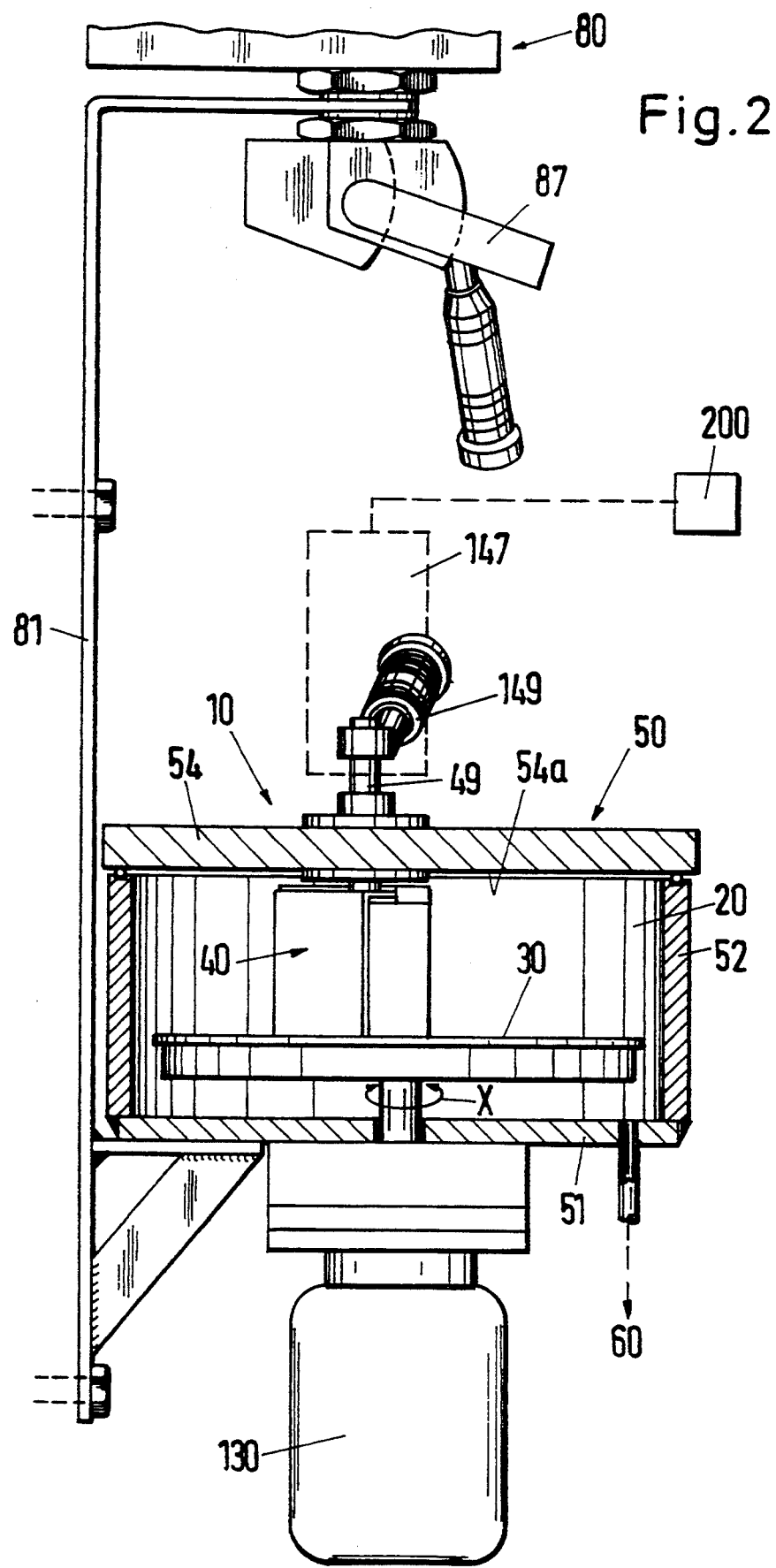
FIG. 2 shows, in a side view, partly in a vertical section, the complete device depicted in FIG. 1 made up of dispensing means and mixing device.

The device depicted in FIGS. 1 and 2 and identified with 10 for producing a hardenable dual or multi-component filler, more particularly polyester filler, by intermixing a filler with a hardener paste is comprised of a mixing container 50 having a square or circular cross-section. This mixing container 50 is made up of a bottom portion 51, a circumferential side wall 52 rigidly connected to the bottom portion and a cover portion 54 closing the upper container aperture 53 which, with the aid of mechanical means or of a vacuum, is retained on the container side wall 52 in the operative state of the device 10. The interior of the mixing container 50 constitutes the mixing chamber 20.

The cover portion 54 of the mixing container 50 is, within the area of its pivotal point 58, on the side wall 52, provided with a tension spring, pneumatic spring, hydraulic cylinder or the like 56 for the automatic swiveling of the cover portion 54 into its opening position, while on the side opposite the pivotal point 58, a means indicated with 59 for retaining the cover portion 54 on the container side wall 52 may be provided. The restraining of the cover portion 54 on the container side wall 52 may, by way of example, be effected with the aid of a locking screw or the like. The upper circumferential rim 57 of the mixing container 50 is provided with a rubber seal or the like in order to achieve a high degree of sealing in the closed state of the cover portion 54 (FIG. 1).

The mixing container 50 consists of metallic materials, plastic materials or other suitable materials.

For the generation of a vacuum in the mixing chamber 20 of the mixing container 50, said mixing container 50 is provided with a connecting piece 55 which communicates with a vacuum generating means, such as a vacuum pump 60. The connecting piece 55 is preferably mounted on the cover portion 54 of the mixing container 50. The vacuum generating means 60 may be an integrated component part of the mixing container 50. In this case, the vacuum generating means 60 is e.g. secured to the outside of the bottom portion 59. However, there also exists the possibility of providing the connecting piece 55 on the circumferential side wall 52 of the mixing container 50.

Figure 3:
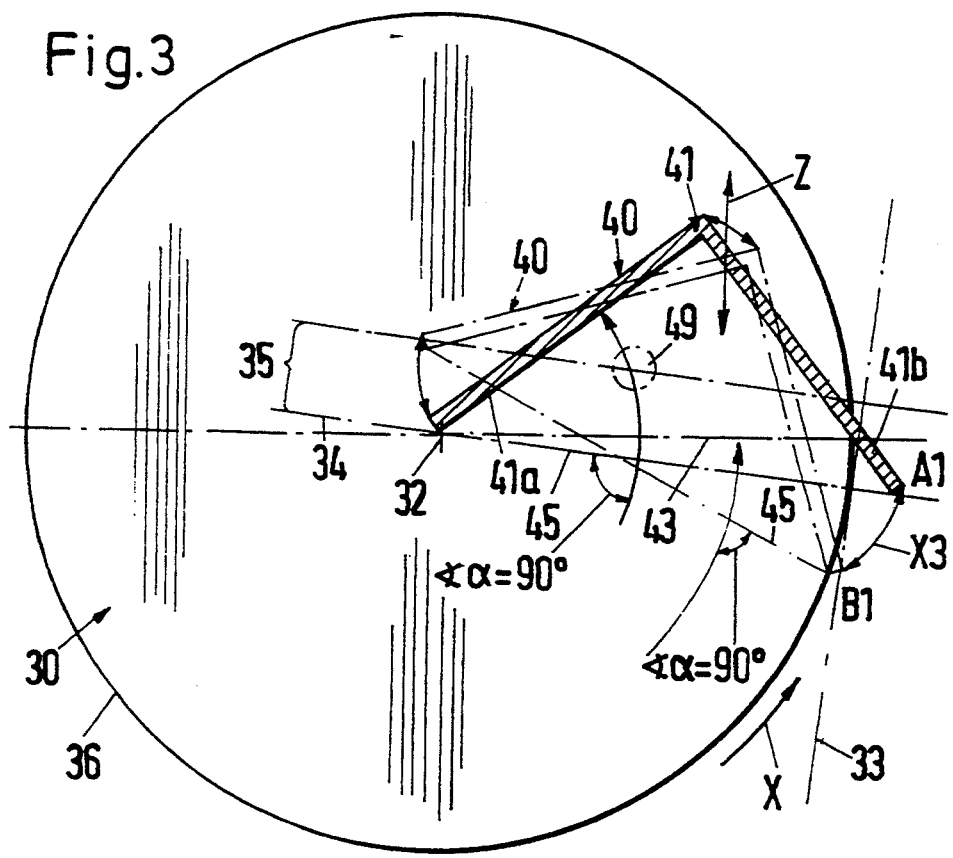
FIG. 3 shows, in a view from the top, a rectangular mixing member disposed on the mixing disk in two different swivel positions.
Figure 4:
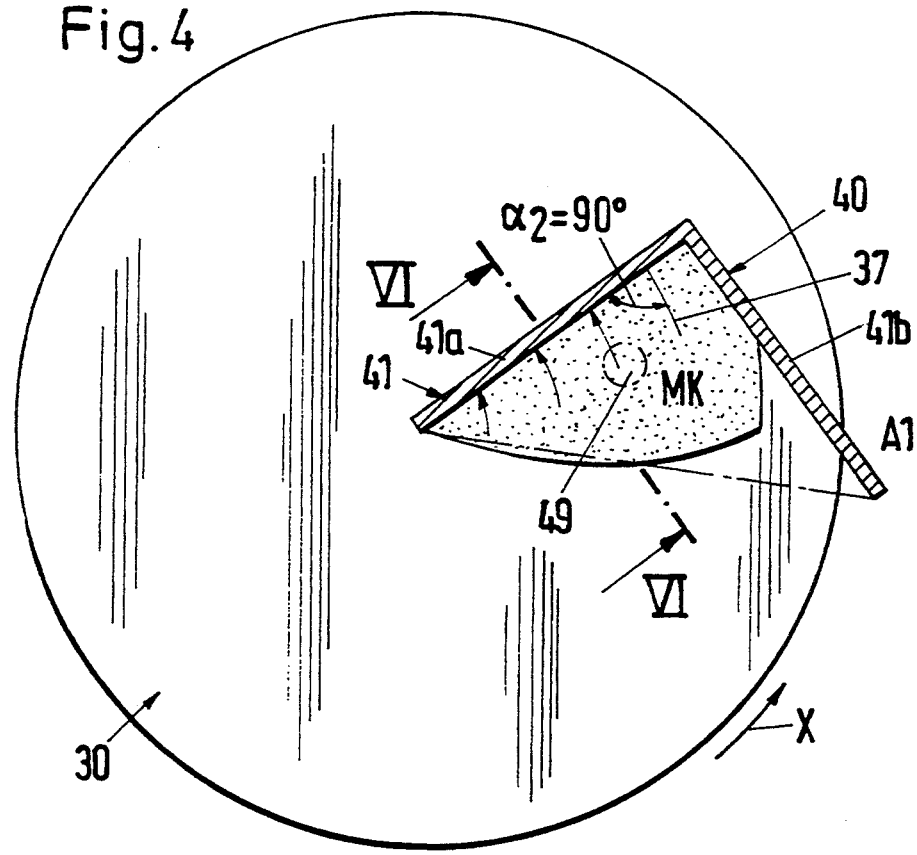
FIG. 4 shows, in a view from the top, the mixing member in one of the two swivel positions with an outwardly flowing filler central point of the filler.
Figure 5:
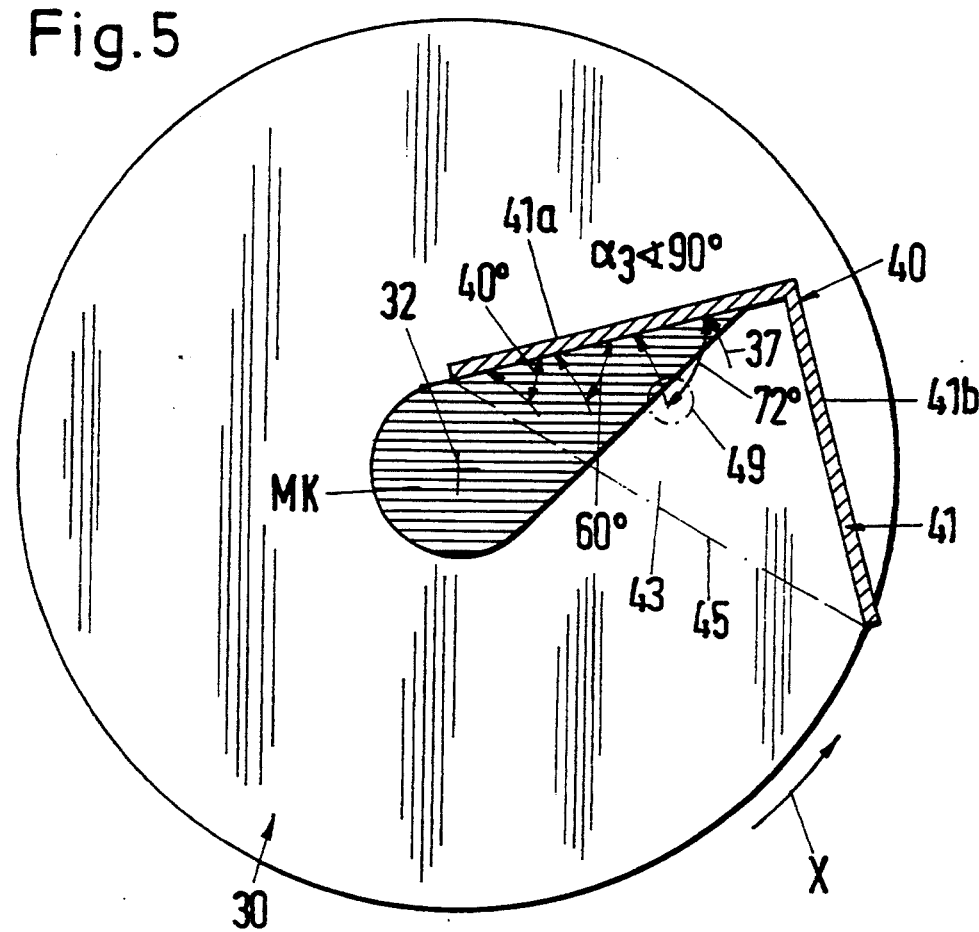
FIG. 5 shows, in a view from the top, the mixing member in the respective other swivel position with an inwardly displaced central point of flow of the filler.

In the mixing chamber 20 of the mixing container 50, a mixing disk 30 is disposed which serves as mixing surface and which is supported on the bottom portion 51 and is driven about its vertical center axis 31 with the aid of a driving means 130 mounted on the bottom portion 51. The rotation of the mixing disk 30 is effected in the direction of arrow X. The driving means 130 is mounted on the outside of the bottom portion 51 of the mixing container 50. The mixing disk 30 is detachably connected to the drive shaft 131 coupled to the driving means 130 and is passed through the bottom portion 51 of the mixing container 50 and this in such a way that the mixing disk 30 can be removed from the drive shaft 131. In this case it is possible to employ a plug connection or some other suitable connecting means. The mixing disk is fabricated from metallic materials, plastics, of a metallic material coated with a plastic or some other suitable material. In addition, the mixing disk 30 is constructed so as to be circular (FIGS. 3 thru 5). In lieu of a rotatingly driven mixing disk, it is also possible to make use of a moved mixing surface, e.g. in the form of a rotatingly driven endless belt.

It is also possible for the mixing disk to be comprised of a supporting disk 39 that is rigidly connected to the drive shaft 131 of the driving means 130. On this supporting disk 39, the actual mixing disk 30 is then disposed which is fabricated from a thin-walled material which, however, possesses an adequate inherent-rigidity. The mounting of this mixing disk 30 on the supporting disk 39 is effected by means of detachable connecting means, such as a bayonet catch, magnetic lock or the like. Owing to the circumstance that the mixing disk 30 is constructed so as to be detachable from the supporting disk 39, it is possible for the mixing disk to be removed from the device 10 in order to serve as a filler carrier when the finished filler is used (FIG. 1). If, on the other hand, the mixing disk 30 is constructed as a single disk and is detachably connected to the drive shaft 131 of the driving means 130, then the mixing disk 30 is drawn off the drive shaft 131 so that it can be utilized as filler carrier when the filler is applied to a point to be repaired. Electromotive driving means or other suitable driving means may be employed as driving means 130.

In the mixing chamber 30 of the mixing container 50, a mixing member is disposed above the mixing disk 30 which is constructed in the form of a shaped member 42 or 142 mounted in the mixing chamber 20 vertically relative to the mixing disk 30 and constructed in the form of a rectangular or curved boundary wall and having the function of a mixing vane and being provided with an opening 43 or 143 which faces the direction of rotation of the mixing disk 30.

According to the embodiment as per FIGS. 1 and 2, the shaped member 42 is constructed so as to be rectangular and in a guide vane-like manner. The rectangularly constructed boundary wall 41 of the shaped member 42 of the mixing member 40 delimits a lateral opening 43, while a covering 140 closes the opening 43 in the upward direction is provided (FIG. 1). If, on the other hand, the mixing member 40 is comprised of a shaped member 142 with a curved boundary wall 141, in such a case the lateral opening 143 formed by said curved boundary wall 143 is likewise closed in the upward direction by means of the covering 140.

The mixing member 40 which does not participate in the rotation of the mixing dish 30 is disposed vertically relative to the mixing disk 30 on the latter. The mounting of the mixing member 40 in the mixing chamber is effected by means of a swivel shaft 49 passed through the cover portion 54 of the mixing container 50, while the end 49a of the swivel shaft 49 that is passed out of the cover portion 54 is provided with a grip-like handle 149. On account of this arrangement, the mixing member 40 is retained on the inner wall area 54a of the cover portion 54 (FIG. 1). If the cover portion 54 of the mixing container 50 is swiveled from its closing position A into the vertical opening position B in the direction of arrow X1, then also the mixing member 40 retained on the cover portion 54 takes part in this swivel motion (FIG. 1). Due to the circumstance that the mixing member 40, by means of the vertical swivel shaft 49, is retained on the cover portion 54 of the mixing container 50, the possibility exists of, with the aid of the grip-like handle 149 fastened to the swivel shaft 49, alternately swiveling the mixing member 40 about the vertical swivel shaft 49 in the direction of arrow X2, the two different swivel positions A1 and B1 being depicted in FIG. 3, the swivel position A1 in FIG. 4 and the swivel position B1 of the mixing member 40 in FIG. 5. Owing to the disposition and mounting of the mixing member 40 on the cover portion 54 of the mixing container 50, the mixing member can now be swiveled by hand to the one side and now to the other side. Instead of a manual actuation there also exists the possibility of effecting this alternate swiveling of the mixing member 40 in the direction of arrow X2 with the aid of e.g. an electromotively constructed driving means 147. For this purpose, the drive shaft 49 coupled to the mixing member 40 is connected to the driving means 147 disposed on the cover portion 54 of the mixing container 50, which is controlled by means of a control unit 200 in such a way that the mixing member executes an alternate swivel movement during the mixing operation (FIG. 2).

The mixing member 40 is disposed in relation to the mixing disk 30 in such a way that, between the mixing disk 30 and the bottom edge 48 of the mixing member, a small interspace is formed which ensures the unimpeded mobility of the mixing disk 30 to the stationary mixing member 40. The bottom edge 48 of the mixing member 40 is constructed like a knife blade.

Figure 6:
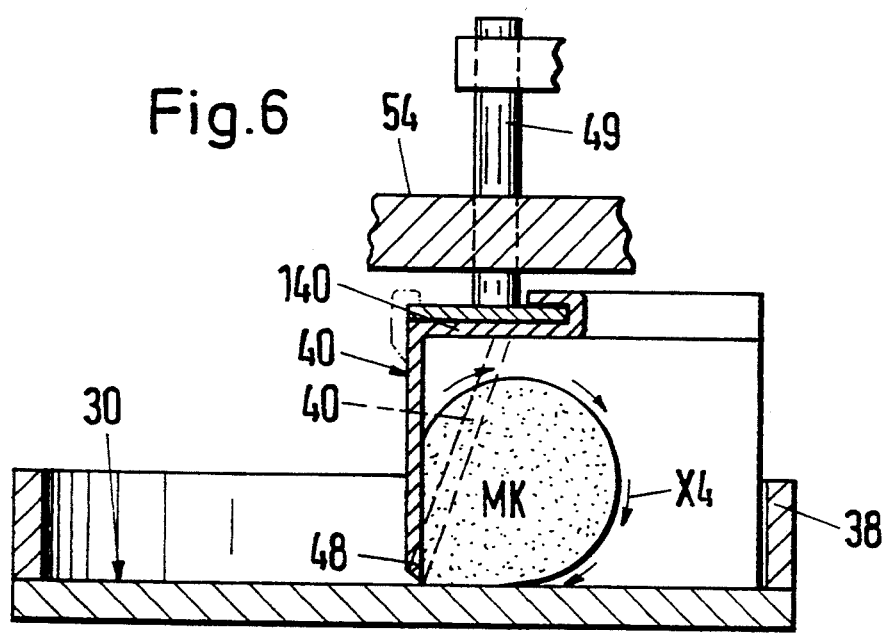
FIG. 6 shows a vertical section in the direction of Line VI—VI in FIG. 4.

The mixing member 40 is fabricated from metallic materials, plastics or of metal coated with a plastic; it is, as shown in FIGS. 1, 2 and 6, disposed so as to be vertical relative to the mixing disk 30. The possibility also exists, however, of disposing the mixing member 40 in an angular position relative to the mixing disk 30, as is indicated in dashed lines in the FIG. 6. The disposition of the mixing member 40 is effected eccentrically on the cover portion 54 of the mixing container 50.

In the same manner as the mixing member 40 which is formed of a rectangularly configured shaped member 42, the mixing member 40, which is formed of a curved shaped member 142, is likewise disposed on the cover portion 54 of the mixing container 50.

In both embodiments of the mixing element 40, the rectangular boundary wall 41 and the boundary wall 141 extending in a bent or curved fashion is vertical relative to the mixing disk 30, while an oblique position of the boundary walls 41,141 is also possible.

In the mixing device 10, a circular mixing disk and a mixing member 40 are employed, the opening 43,143 of which formed by the longitudinally curved or rectangular boundary wall 41,141 possesses a length that is equal to or smaller than the radius of the mixing disk 30, the central point of which is indicated with 32.

The angular position of the opening 43,143 of the boundary wall 41,141 of the mixing member 40 forming the vertical opening surface 45, is changeable relative to the tangent line 33 plotted on the mixing disk 30 (FIG. 3).

The mixing member 40 is, in relation to the mixing disk 30, disposed in such a way that the vertical opening surface 45 of the opening 43,143 formed by the boundary wall 41,141 of the mixing member 40 extends parallel to the radius line 34 of the mixing disk 30 and through the central point of the mixing disk 32 and is swivelable about its vertical shaft 46 in such a way that the opening surface 45 of the opening 43, 143 is located at an angle to the radius line 34 (position A1 in FIG. 3 and position A2 in FIG. 7), or that the opening surface 45 of the opening 43,143 extends offset by one section 35 relative to the radius line 34 and the opening 43,143 points toward the central point 32 of the mixing disk (position B1 in FIG. 3 and position B2 in FIG. 7). In this case the mixing member 40 is, relative to the mixing disk 30, disposed in such a way that the circular lines 37 of the mixing disk 30 impinge upon the wall section 41a facing the mixing disk central point 32 of the two wall sections 41a,41b of the boundary wall 41 of the mixing member 40 at the right angle α (FIG. 4). Here, all angles of impingement or impact are 90°. Due to the higher peripheral velocity, the flow tendency of the mixture composition is in the outward direction.

If, on the other hand, the rectangularly constructed mixing member 40 assumes the position B1 depicted in the FIGS. 3 and 5, then the mixing member 40 is disposed relative to the mixing disk 30 in such a way that the circular lines 47 of the mixing disk 30 impinge at an acute angle α1 upon the wall section 41a facing the mixing disk central point 32 of the two wall sections 41a,41b of the boundary wall 41 of the mixing member 40. In this case, all angles of impingement are smaller than 90° and the tendency of flow of the mixture composition takes place in the direction toward the mixing disk central point 32.

In correspondence with the course of the circular lines 37 of the mixing disk 30 relative to the rectangularly constructed mixing member 40, also the mass particles of the mixture composition MK impinge at an angle α2 of 90° upon the section 41a of the mixing member 40 when the mixing member assumes the position A1 depicted in FIG. 4. However, if the mixing member 40 assumes the position B1 depicted in FIG. 5 relative to the mixing disk 30, then the molecules of the mixture composition MK impinge upon the boundary wall 41 of the rectangular mixing element 40 at an angle α3 of less than 90° (FIG. 5).

Figure 10:
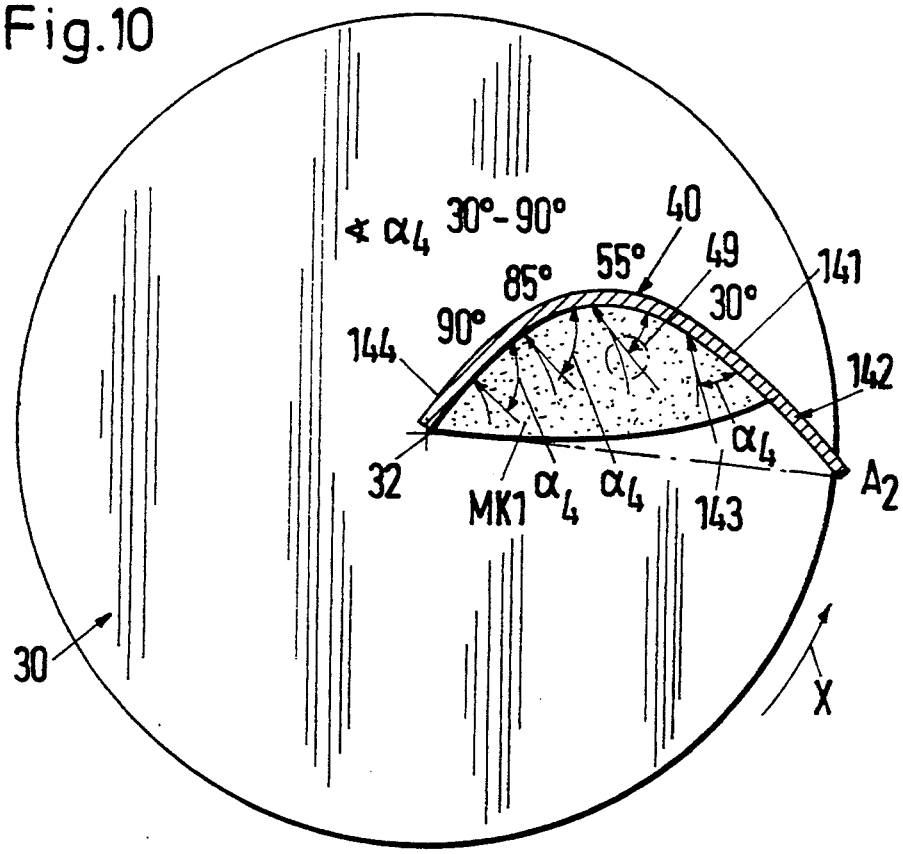
FIG. 10 shows, in a view from the top, the mixing disk with the curved mixing member arranged thereupon in a horizontal section in one of the two swivel positions depicted in FIG. 7.
Figure 11:
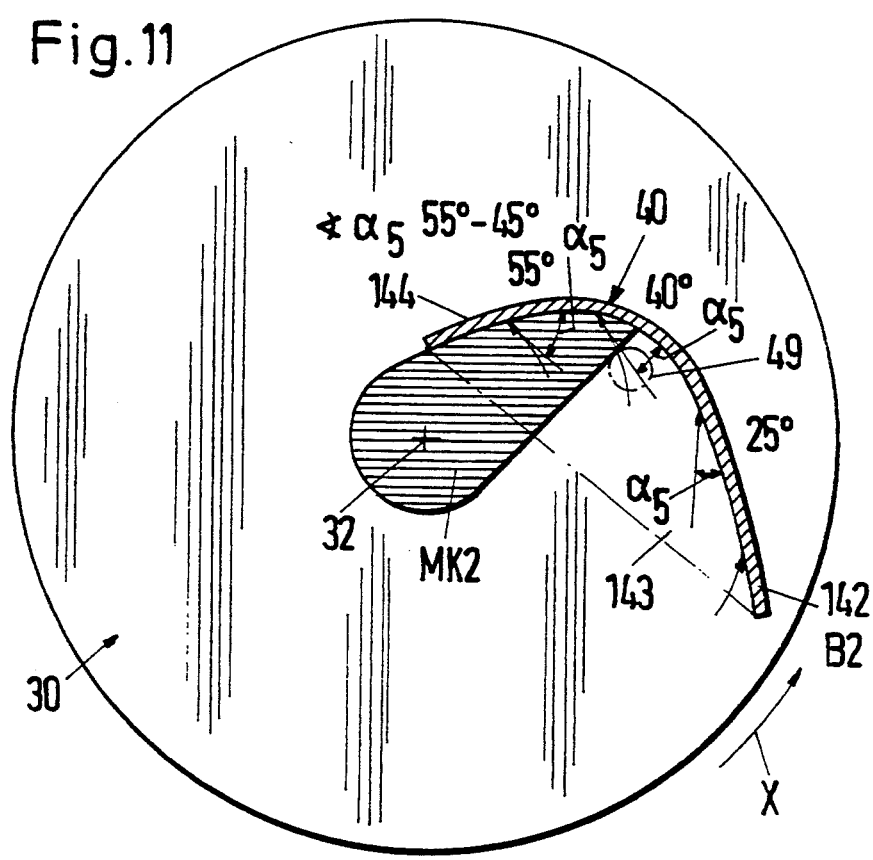
FIG. 11 shows, in a view from the top, the mixing disk with the curved mixing member arranged thereupon in a horizontal section in the respective other swivel position according to FIG. 7.

In a manner similar to how the allocation of the rectangular mixing member 40 is effected relative to the mixing disk 30, the allocation of the mixing member 40 having a curvedly constructed boundary wall 141 relative to the mixing disk 30 is also effected (FIG. 7). The curved mixing member 40, too, is alternately moved in the direction of arrow X3 from the position A2 into the position B2 and, from there, again into the position A2 corresponding to the rectangularly constructed mixing member 40 (FIG. 3). This mixing member 40 with its curved vertical boundary wall 141 is, in relation to the mixing disk 30, in its position A2 disposed in such a way that the mass particles of the mixture composition MK impinge within an angular area α4 of 30° thru 90° extending from the outside toward the inside upon the boundary wall 141 of the curved mixing member 40 (FIG. 10). In the position B2, on the other hand, the curvedly constructed mixing member 40 is disposed in such a way relative to the mixing disk that the mass particles of the mixture composition MK, in the section 144 of the boundary wall 141 facing the central point 32 of the mixing disk 30, impinge within an inwardly extending angular area α5 of 55° to 45° upon the boundary wall 141 of the mixing member 40 (FIG. 11). The mixture composition MK assumes, in the different positions A2,B2 of the curvedly constructed mixing member 40, different shapes, as is depicted in FIG. 7. In the position A2 of the mixing member 40, the mixture composition MK1 (FIG. 8) is located in the interior delimited by the curvedly constructed mixing member 40 and is limited by the wall area of the boundary wall 141. However, if the mixing member 40 is moved from position A2 into position B2, then the mixture composition MK2 migrates in the direction of the central point 32 of the mixing disk 30 and beyond this central point (FIGS. 7 and 9).

The swivel range of the mixing member 40 from its position B2 into the position B2 is indicated in FIG. 7 by the angle β. If the mixing member 40 assumes the position B2, then the mixture composition MK2 possesses an approximately guttiform shape, and if the mixing member is moved back from position B2 into position A2, then the mixture composition MK2 travels together with the mixing member 40 while its bulk is simultaneously deformed so that the mixture composition MK is subjected to a constant and changing deformation, the respective limits of the two deformations being represented by the mixture compositions MK1 and MK2. This constant deformation of the mixture composition MK during the changing swivel motions of the curvedly constructed mixing member 40, in connection with the rotatingly driven mixing disk 30 and the boundary wall of the mixing member 40, brings about a thorough intermixing and kneading of the filler with the hardener paste so that a homogeneous intermixing is achieved within a very short time.

Both the mixing member 40 with its rectangular boundary wall 41 as well as the mixing member 40 with its curved boundary wall 141 are moved alternately relative to the mixing disk 30, to be more precise, the rectangularly constructed mixing member is moved in such a way that the mass particles of the mixture composition MK now impinge at an angle α2 of 90°, now at an angle α3 of less than 90° upon the boundary wall 41 of the mixing member 40 (FIGS. 4 and 5). In this case the rotary movement during the mixing and kneading operation of the mixture composition MK takes place in the direction of arrow X4 (FIG. 6). The curvedly constructed mixing member 40 is moved alternately relative to the mixing disk 30 in such a way that the mass particles of the mixture composition MK now impinge within an angular area α4 of 30° thru 90° extending from the outside toward the inside, and now within an angular area α5 of 55° thru 45° in the section 144 facing the central point 32 of the section 144 of the boundary wall 141 of the mixing member 40 upon the same (FIG. 7).

During the mixing operation, the rotational speed of the mixing disk is selected in such a way that the material to be mixed remains on the mixing disk 30 in spite of the existing centrifugal force. When material of low viscosity is to be mixed, it is of advantage if the mixing disk 30 is fitted with a vertical circumferential rim 38 (FIG. 6).

Figure 12:
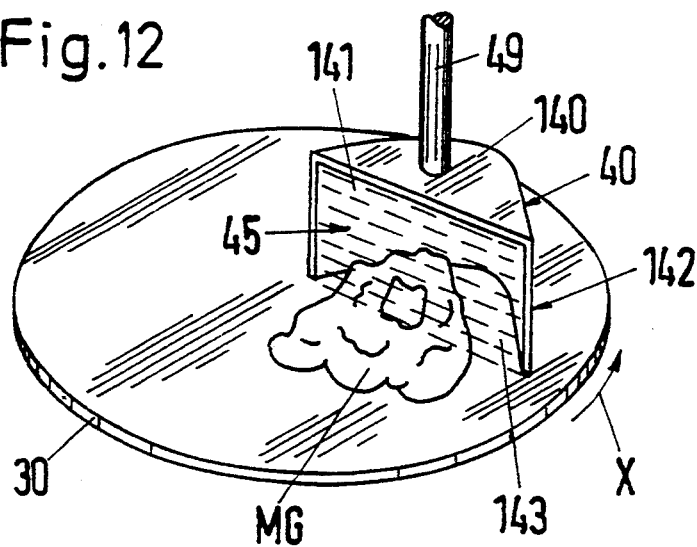
FIG. 12 shows, in a diagrammatical view, the mixing disk with allocated guide vane-like mixing member with filler compounded with hardener placed on the mixing disk and in front of the mixing member.
Figure 13:
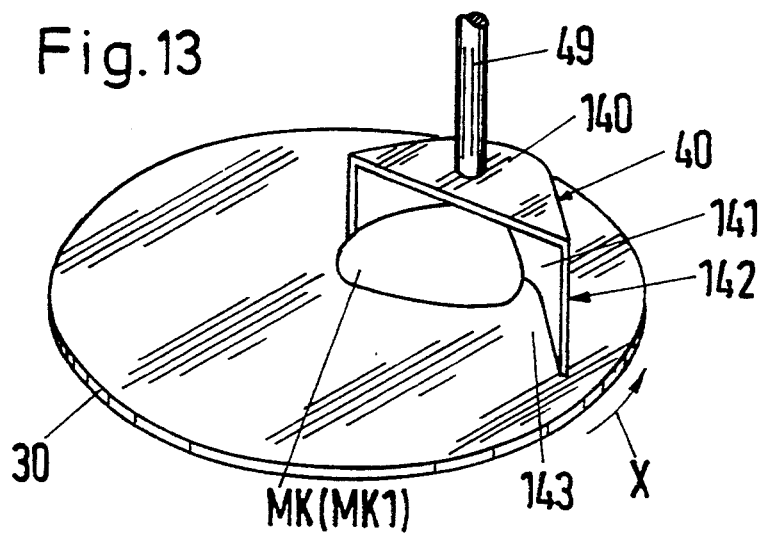
FIGS. 13 and 14 show, in diagrammatical views, the mixing device during the mixing operation in different swivel positions of the mixing member.
Figure 14:
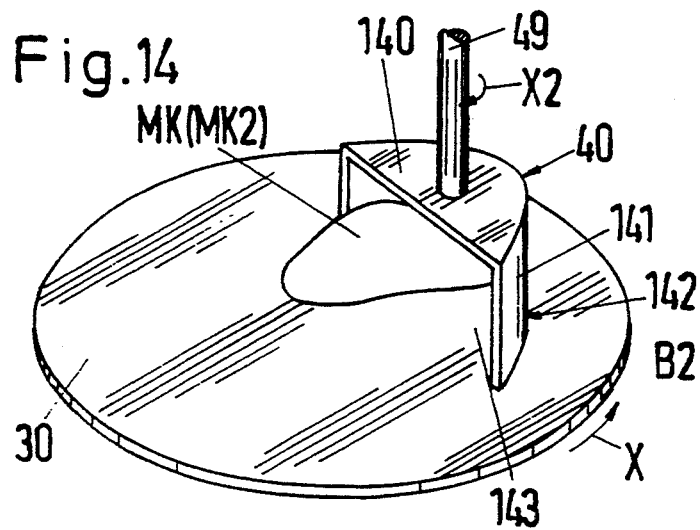

The mixing device 10 is used as described below:

The delivery of the mixture components, such as filler and hardener paste, is effected at a predetermined ratio in metered quantity either manually or with the aid of a means indicated in FIG. 1 with 80 still to be described in greater detail hereinafter, with which a metered dispensing of filler and hardener paste is possible. In this case the mixing device 10 and the dispensing means 80 form one structural unit in which the two apparatuses 10 and 80 are mounted on a supporting frame 81. The dispensing means 80 possesses mounting means 84,85 for accommodating a container 82 containing filler and a cartridge 83 for holding the hardener paste. Filler and hardener paste are, by means of hydraulically actuatable pistons, supplied to discharge or delivery apertures 90,91 which are opened or closed by means of a swivel slide 87, said swivel slide being, by means of a grip-like handle 92, swivelable about the swivel shaft 88 either manually or with the aid of mechanical, pneumatic or electromotive facilities. If the delivery apertures 90,91 are unblocked, then hardener paste and filler are put on the mixing disk 30 with the mixing container 50 being open. Filler and hardener are, by way of example, supplied at a ratio of 3 parts hardener and 97 parts synthetic material to the mixing disk 30. If the material to be mixed MG is on the mixing disk 30 (FIG. 12), then the mixing container 50, by its cover portion 54 being placed on the same by hand, by mechanical, pneumatic or electromotive means, is closed while, at the same time, during the closing operation, together with the cover portion 54, the mixing member 40 is swiveled into the mixing chamber 20 of the mixing container 50 so that, with the cover portion 54 closed, the mixing member 40 comes to lie above the mixing disk 30 (FIGS. 12 thru 14). Following the closing of the cover portion 54, the vacuum generating means 60 is put into operation and the mixing chamber is evacuated. At the same time, the mixing disk 30 is set into rotation with the aid of its driving means 130 so that the mixing disk 30 rotates in the direction of arrow X while the mixing member 40 is stationary in the mixing chamber 20. Due to the mixing disk 30 moving toward the mixing member 40 in the direction of arrow X, the material to be mixed MG is conveyed into the guide vane-like constructed mixing member 40, while the further movement is then restricted by the rectangular boundary wall 41 or by the curved boundary wall 141 of the mixing member 40. Owing to the constantly rotating mixing disk 30, the material to be mixed is set in motion in the direction of arrow X4 (FIG. 6). Induced by the motion cycles, the material to be mixed MG (FIG. 12) is formed within the space made up by the vane-like mixing member 40 into the mixture composition MK depicted in FIGS. 13 and 14, while the position and the shape of these mixture compositions depend on the respective position of the mixing member 40. In the position A1 of the mixing member 40, the mixture composition MK is located in the interior of the mixing member 40 (FIG. 13), while in the position B1 of the mixing member 40, the mixture composition extends more in the direction toward the central point 32 of the mixing disk 30 (FIG. 14). The mixing operation is performed under a vacuum. This vacuum is maintained throughout the entire mixing period. By means of the swivelable mixing member 40, an intensive intermixing of the two or more components takes place on the mixing disk 30, while the mixing member 40 has at the same time the function of a wiping means. In an inclined position of the mixing member 40, the rotary movement takes place more rapidly as compared with a 90° position, which is due to the longer contact area with the underlying ground. Mixing duration and rotational speed are predetermined and dependent of the total quantity of the respective components to be intermixed.

After the termination of the mixing operation, by swiveling the cover portion 54 from the closing position A into the position B (FIG. 1), the mixing container 50 is opened and the mixing disk 30 with the mixed material on it can then be removed from the mixing device 10.

The mixing device 10 is especially suitable for the production of small quantities of medium or more highly viscous dual or multicomponent compounds, such as fillers, more particularly polyester fillers which are used for the evening out of unevennesses of the sheets of automobile bodies that have suffered damage in accidents or for other sheet metal repairs. For this purpose, a synthetic material is intermixed with a colorless or dyed hardener, e.g. at a mixture ratio of 3 parts hardener and 97 parts synthetic material or at some other suitable mixture ratio.

The mixing disk 30 may also be constructed so as to be replaceable and it is then connected to the rotatingly driven supporting disk by means of cams.

Figure 15:
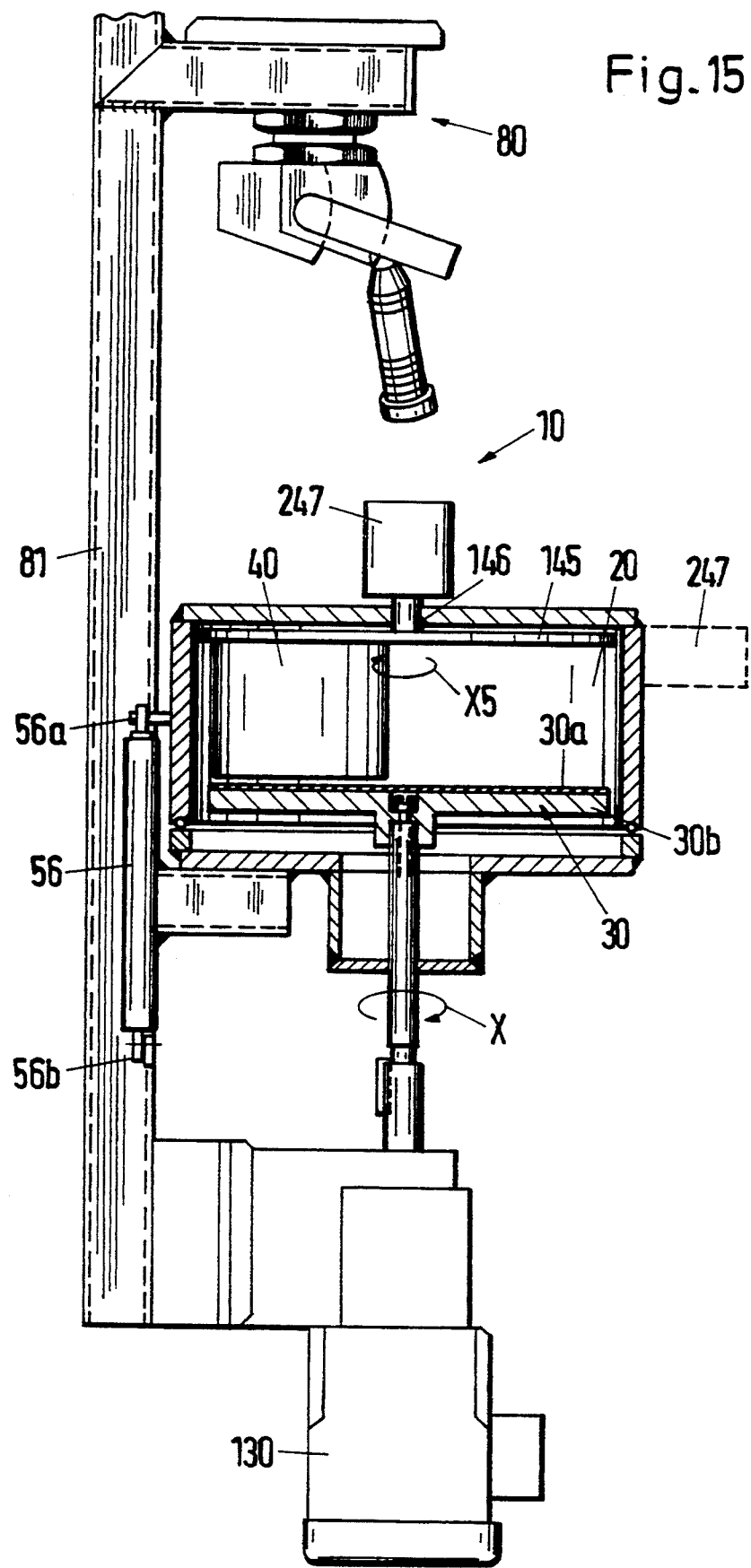
FIG. 15 shows, partly in a side view and partly in a vertical section, a mixing device allocated to a means for the simultaneous and metered dispensing of the filler and hardner paste for intermixing filler with a hardener while making use of a rotatingly driven mixing disk and a mixing member that is likewise rotatingly driven relative to the latter.

According to a further embodiment, the mixing disk 30 is comprised of two superimposed disk members 30a, 30b having the same or disparate dimensions, both of which are interconnected by means of detachable connecting means, such as adhesive lock, magnetic lock or the like and of which the upper disk member 30a is constructed in the form of a filler support or support for material to be mixed (FIG. 15). If the mixing disk 30 or the upper disk member 30a of the two disk members 30a, 30b forming the mixing disk 30 provided with an upwardly drawn, circumferential rim 38. In that case the mixing disk or the disk member 30 may be comprised of an elastic material such as rubber or a material which resembles rubber.

In proportion to the quantities of material to be mixed MG used, the same assumes different shapes. In FIG. 1, different quantities of material to be mixed are depicted identified with MG1, MG2 and MG3. The curve MG1 corresponds to a quantity of material to be mixed of approximately 250 g, the curve MG2 corresponds to a quantity of material to be mixed of approximately 150 g and the curve MG3 corresponds to a quantity of material to be mixed of approximately 100 g.

In the mixing device 10 according to FIGS. 1 and 2, the mixing disk 30 is, as compared with the stationary mixing member 40 disposed in the mixing chamber 20, rotatingly driven. According to a further embodiment as per FIG. 15, the mixing disk 30 and the mixing member 40 of the mixing device 10 are driven so as to be counterrotating relative to each other. Also in this embodiment, the mixing device 10 is comprised of a mixing container 50 having a square or a circular cross-section, of a bottom portion 51, of a circumferential side wall 52, of a cover portion 54 which closes the upper container opening 53, which, with the aid of mechanical means or by means of a vacuum, is retained on the container side wall 52 in the operative state of the mixing device 10, of a horizontal mixing disk 30 disposed in the mixing chamber 20 of the mixing container 50, said mixing disk being supported on the bottom portion 51 and rotatingly driven about its center shaft 31 with the aid of a driving means 130 mounted on the bottom portion 51, and of a mixing member 40 above the rotatingly driven mixing member 40, driven counterrotatingly as compared with the latter about a vertical shaft 146 with the aid of a driving means 247 to the direction of rotation of the mixing disk 30. The mixing member 40 is constructed in the form of a shaped member 42,142 disposed in the mixing chamber vertically to the mixing disk 30 having the function of a mixing vane, while said shaped member is comprised of a rectangular or curved boundary wall 41,141. The mixing disk 30 is detachably connected to the drive shaft 131 of the driving means 130 or is comprised of two detachably interconnected disk members 30a, 30b. The mixing member 40 rotating opposite the rotating mixing disk 30 is radially attached to a driving disk 145 supported on the inner wall area 54a of the cover portion 54 of the mixing container 50, which is in operative connection with the driving means 247, here the driving means 247 is disposed on the outside of the cover portion 54 and connected to the shaft 146, it also being possible, however, for the driving means 247 to be disposed on the outer wall area of the side wall 52. The drive shaft of the driving means 247 is then connected to the driving disk 145 by means of an appropriately constructed gear unit in order to rotatingly drive the driving disk 145 in the direction of arrow X5 (FIG. 15). Also in this embodiment, the mixing member 40 is constructed so as to be swivelable and so as to be able to swivel the mixing member 40 within the area of the positions A1, B1 or A2, B2. For the purpose of this swivelability of the mixing member 40, on the driving disk 145, the driving means 147 connected to the drive shaft 49 for the mixing member 40 is disposed, which, by means of the control unit 200, is controlled in such a way that the mixing member 40 executes a reciprocal swivel movement.

Figure 16:
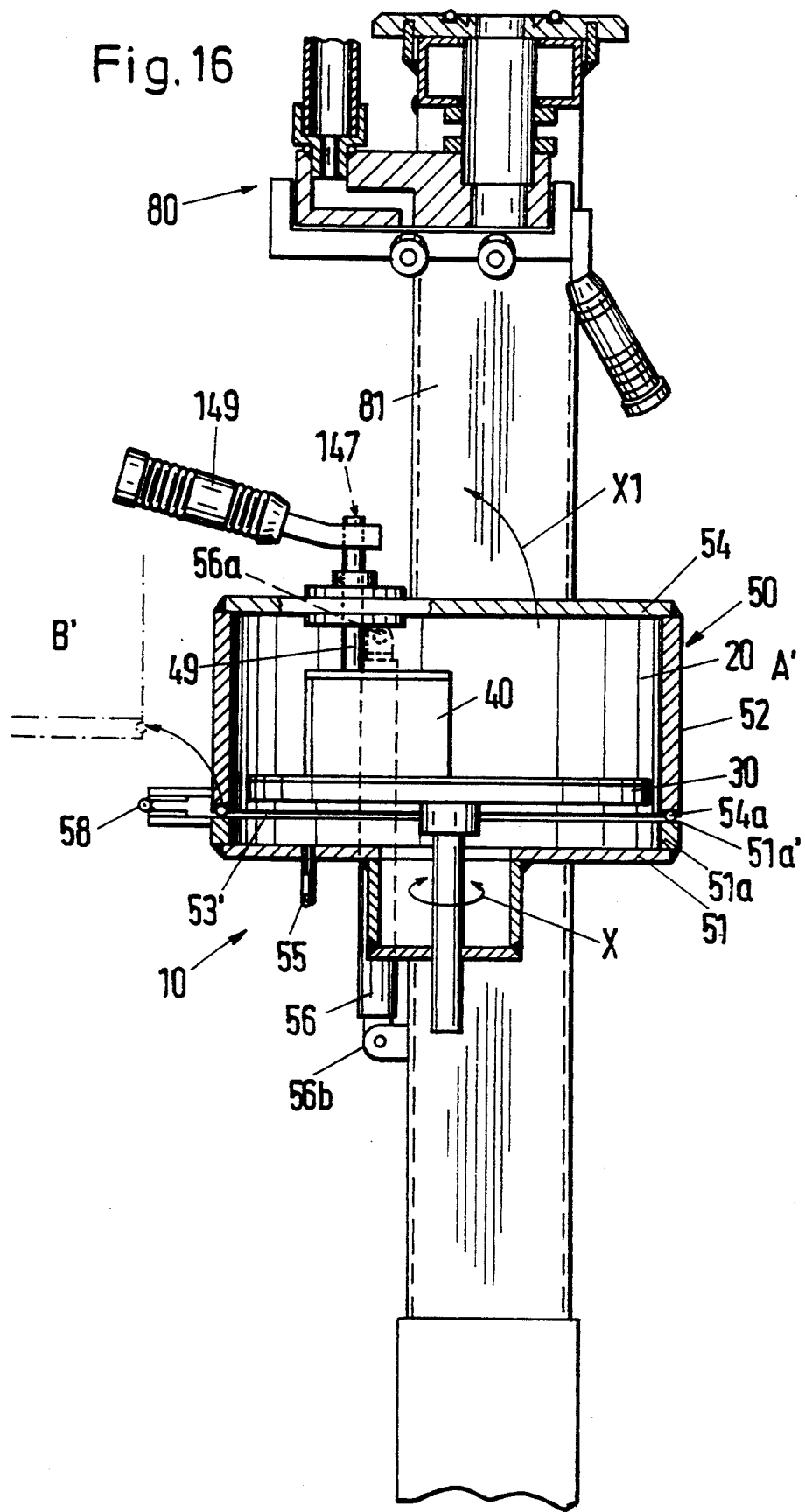
FIG. 16 shows in a front view with partly vertically sectioned portions, a further embodiment of the mixing device with a mixing container, the cover portion of which is constructed in a hood-like fashion.

In the embodiment shown in FIG. 16, the device 10 is provided with a mixing container 50, the cover portion 54 of which is constructed in the manner of a hood or dome and is seated on the circumferential rim 51a' of the vertical side wall 51a of the bottom portion 51. The bottom portion 51 is constructed in a plate-like manner and provided with a circumferential rim 51a that is vertical relative to the bottom portion 51. The hood-like cover portion 54 is, with the circumferential rim 54a of the cover portion side wall 52, seated on the circumferential rim 51a' of the side wall 51a of the bottom portion 51 so that the container opening 53' is located within the lower area of the mixing container 50. In the mixing chamber 20, the mixing disk 30 and the mixing member 40 allocated to the same are disposed, said mixing member being alternately swivelable by means of the grip-like handle 149 in the direction of arrow X2 about its vertical shaft, it being also possible for this swiveling to be effected electromotively or with the aid of an otherwise constructed and suitable driving means. The mixing chamber 20 can be evacuated. In the operative state, the hood-like cover portion 54 is maintained with the aid of mechanical means or by vacuum in the closing position. On the one end, at 58, the cover portion 54 is hinged onto the bottom portion 51 so that the opening of the mixing container 50 is effected by swiveling the hood-like cover portion 54 in the direction of arrow X1 from the position A' into the position B', while the mixing member 40 retained on the cover portion 54 swivels along into the opening position B' so that the mixing disk 30 is freely accessible for the removal of the mixed material. The opening of the mixing container 50 is assisted by a tension spring, pneumatic spring, hydraulic cylinder or the like 56, which, at 56a and 56b, is attached to the cover portion side wall 52 and to the bottom portion 51 or to the wall retaining means 81. The device 10 is, in connection with the means 80, secured to a wall retaining means 81 for the metered dispensing of fillers and hardener pastes. Both apparatuses 10,80 and in this case superjacently disposed in such a way that, with the aid of means 80, filler and hardener or hardener paste can be delivered onto the mixing disk 30 direct when the mixing container 50 is open.

The construction of the mixing device 10 with a mixing container 50, whose cover portion is constructed in a hood-like fashion and which is seated upon a plate-like bottom portion 51, by means of which the removal opening of the mixing container is moved into the vicinity of the bottom portion, offers the advantage that it will no longer be necessary to lift the mixing disk 30 over the side wall 52 rigidly connected to the bottom portion 51 of the mixing container 50 depicted in FIGS. 1 and 2, but that the material to be mixed together with the mixing disk 30, rests freely on the bottom 52 for removal.

Figure 17:
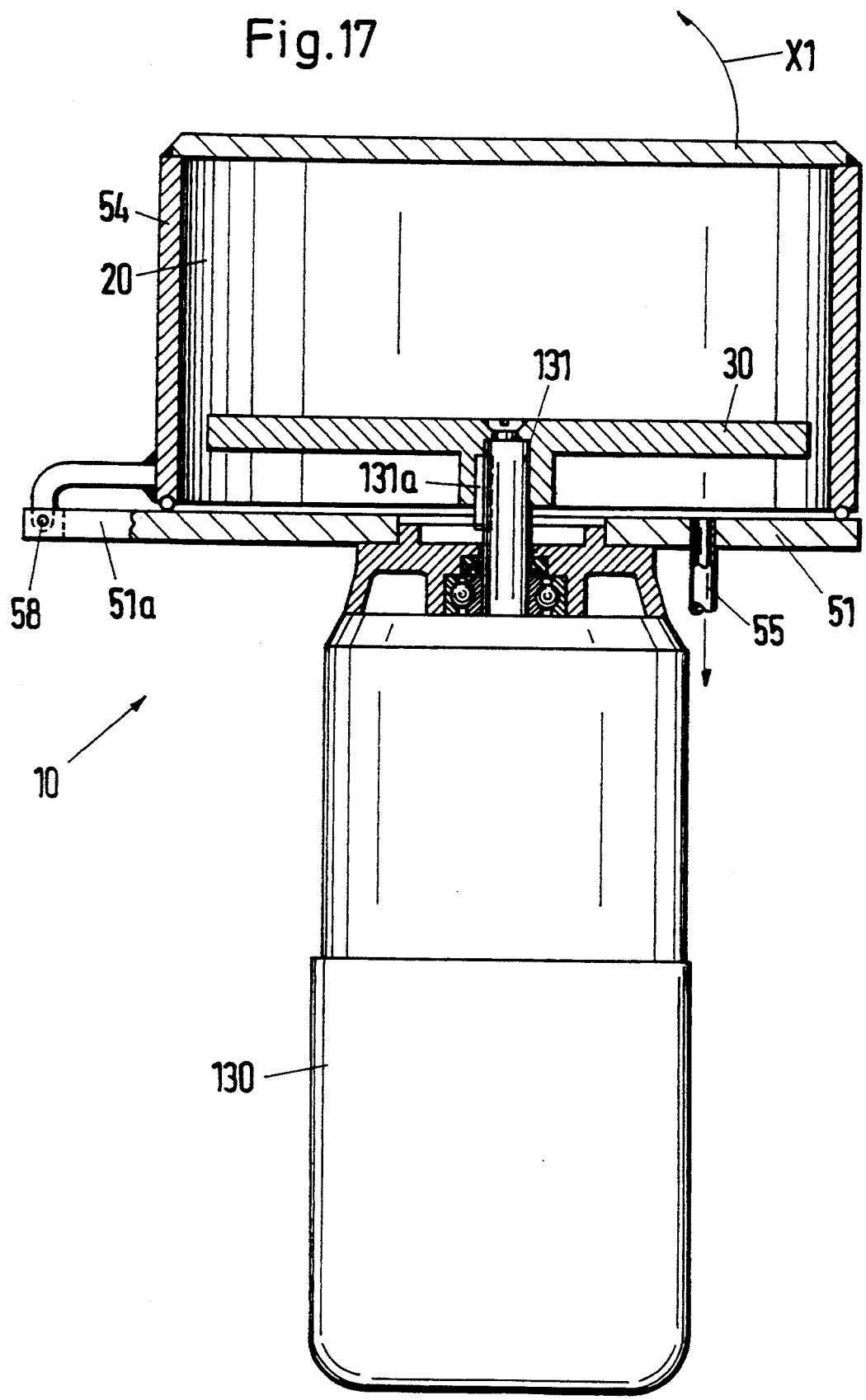
FIG. 17 shows, partly in a side view and partly in a vertical section, a mixing device with a mixing disk mounted detachably on the drive shaft of the driving means.
Figure 18:
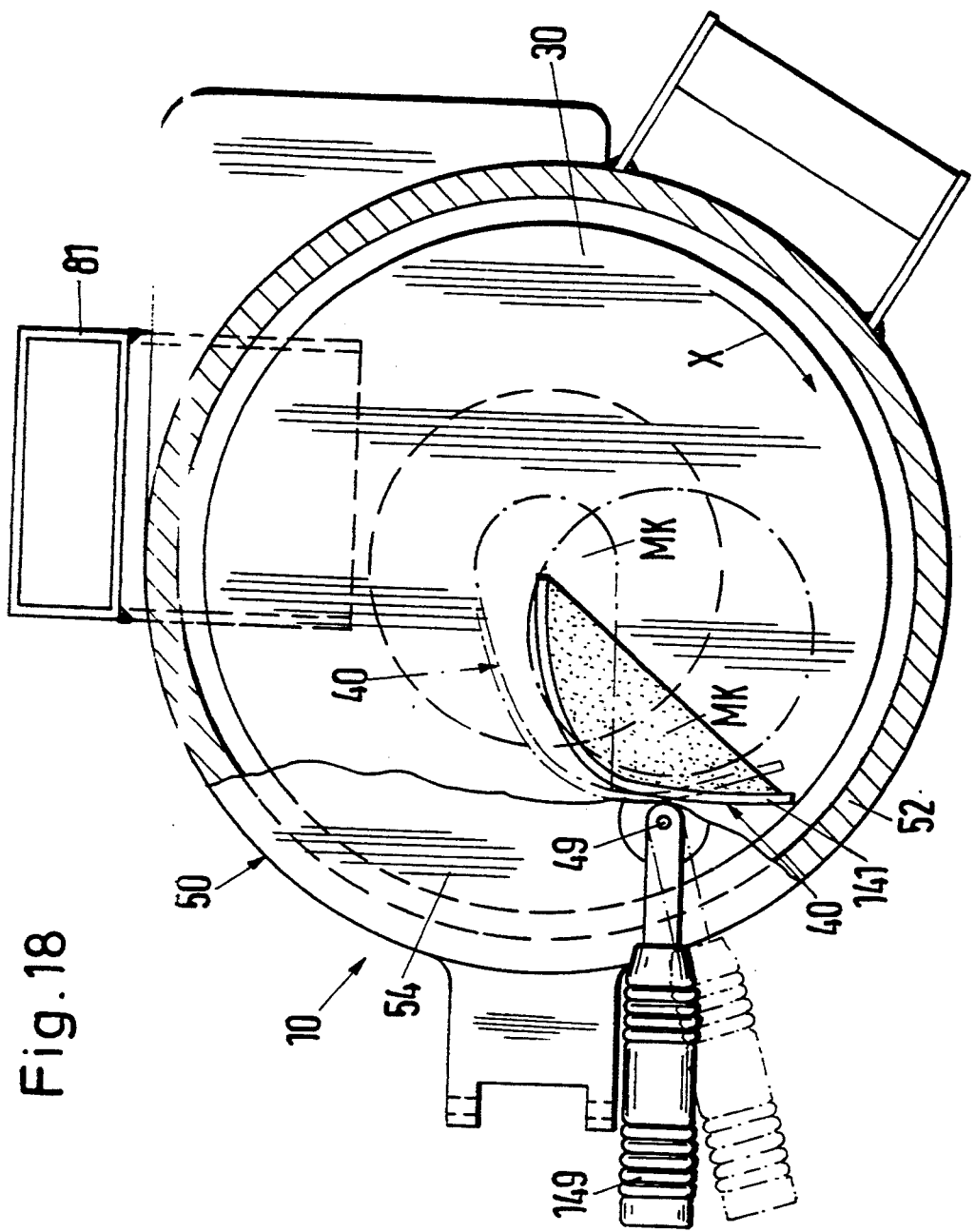
FIG. 18 shows, partly in a view from the top and partly in a horizontal section, the mixing device according to FIG. 1.

In the mixing device 10 according to FIGS. 17 and 18, the mixing container 50 is comprised solely of a plate-like bottom portion 51, upon which the hood-like cover portion 54 is fitted. In order to bring about a complete exposure of the mixing disk 30, the hood-like cover portion 54 is hinged onto an extendedly constructed section 51a of the bottom portion 51 at 58 so that the cover portion 54 can be folded out completely from the area of the mixing disk 30. In the opened state of the mixing container 50, the mixing disk 30 can be readily removed, it being inserted onto its drive shaft 131 and entrained by means of a carrier bolt 131a by the rotating drive shaft 131. Just like in the other embodiments, in the mixing chamber, above the mixing disk 30, the mixing member 40 is disposed with a rectangular or curved boundary wall 41,141, while the mixing member 40 is not shown in FIG. 17. In this case, too, the alternate swiveling of the mixing member 40 is effected either by hand with the aid of the grip-like handle 149 or by means of an electromotive drive (FIG. 19).

Figure 19:
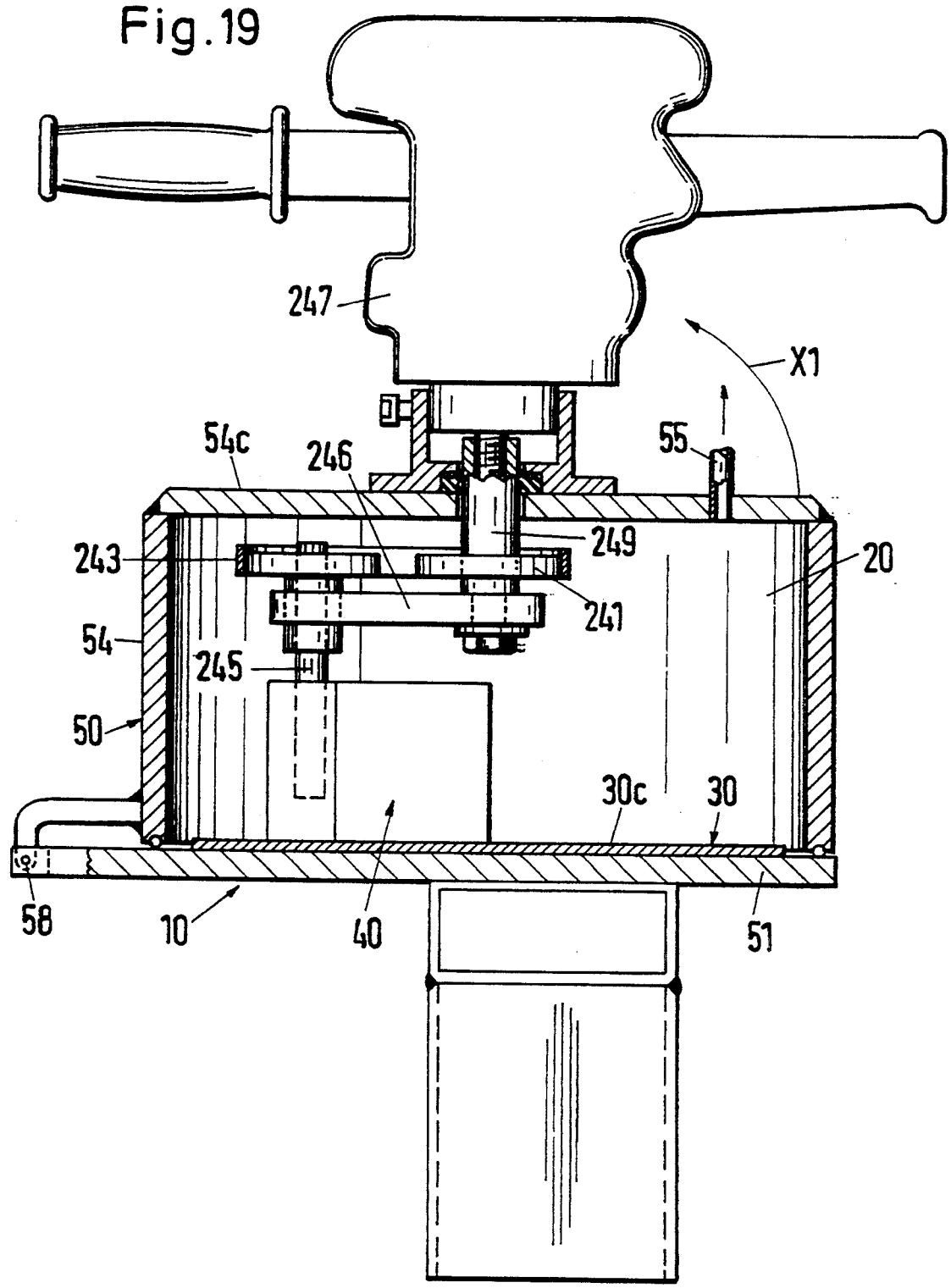
FIG. 19 shows, partly in a side view and partly in a vertical section, a mixing device with a mixing member rotating relative to the mixing disk.
Figure 20:
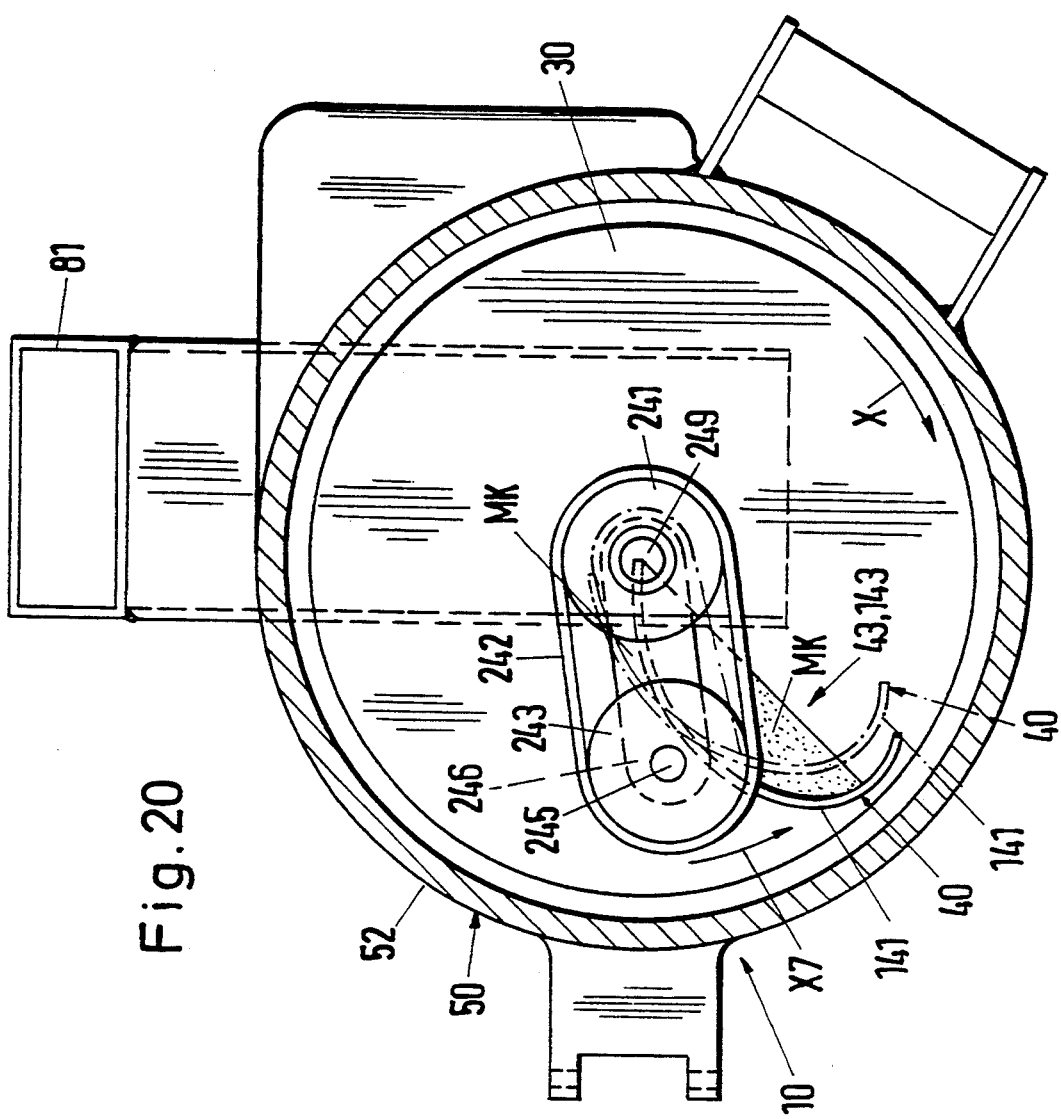
FIG. 20 shows, partly in a view from the top and partly in a horizontal section, the mixing device according to FIG. 19.

In the embodiment according to FIGS. 19 and 20, the mixing member 40 is rotatingly driven above the stationary mixing disk 30. The mixing container 50 is, in its mixing chamber 20, provided with the mixing member 40 which is vertical to the horizontal mixing disk 30 which is constructed in the form of a plate-shaped disk member 30c that is detachably disposed on the bottom portion of the mixing container 50. The mounting of the disk member 30c on which the filler and the hardener paste are intermixed, is effected e.g. by means of a magnetic adhesive connection; it is possible, however, to achieve the temporary adhesion of the disk member 30c to the bottom portion 51 by means of an applied vacuum. The disk member 30c is fabricated from metallic materials or other suitable materials. In the closed state of the mixing container 50, its mixing chamber 20 is evacuable.

The driving means 247 for the mixing member 40 is disposed on the outside of the upper covering 54c of the hood-like cover portion 54, which may also be constructed according to FIGS. 1 and 2. The drive shaft 249 of the driving means 247 is passed through the upper covering 54c and, on its free end, bears a supporting arm 246 disposed in the mixing chamber 20, which supports, on its free end, a swivel shaft 245 that is coupled to the mixing member 40. In addition, the drive shaft 249 carries a belt pulley 241; a further belt pulley is seated on the drive shaft 245 coupled to the mixing member 40. Both belt pulleys 241,243 are interconnected by means of a belt drive 242 with which the position of the mixing member 40 relative to the mixing disk 30 is controlled in such a way that the mixing member 40, during its rotation, either retains the same position relative to the mixing disk 30, or alternately assumes the swivel positions depicted in FIGS. 3 and 7, the latter being achieved manually or electromotively. In the process, the mixing member 40 assumes, relative to the mixing disk 30, the position in which the opening 43,143 of the mixing member 40 is located in the direction of rotation X7 of the mixing member 40 (FIGS. 10 and 20).

In order to be able to readily remove the disk member 30c which, in the mixing device 10 according to FIGS. 19 and 20 constituted the mixing disk 30, from the bottom portion 51, the disk member 30c is, on its circumferential rim, provided with a handle that is not shown in the drawing.

Figure 21:
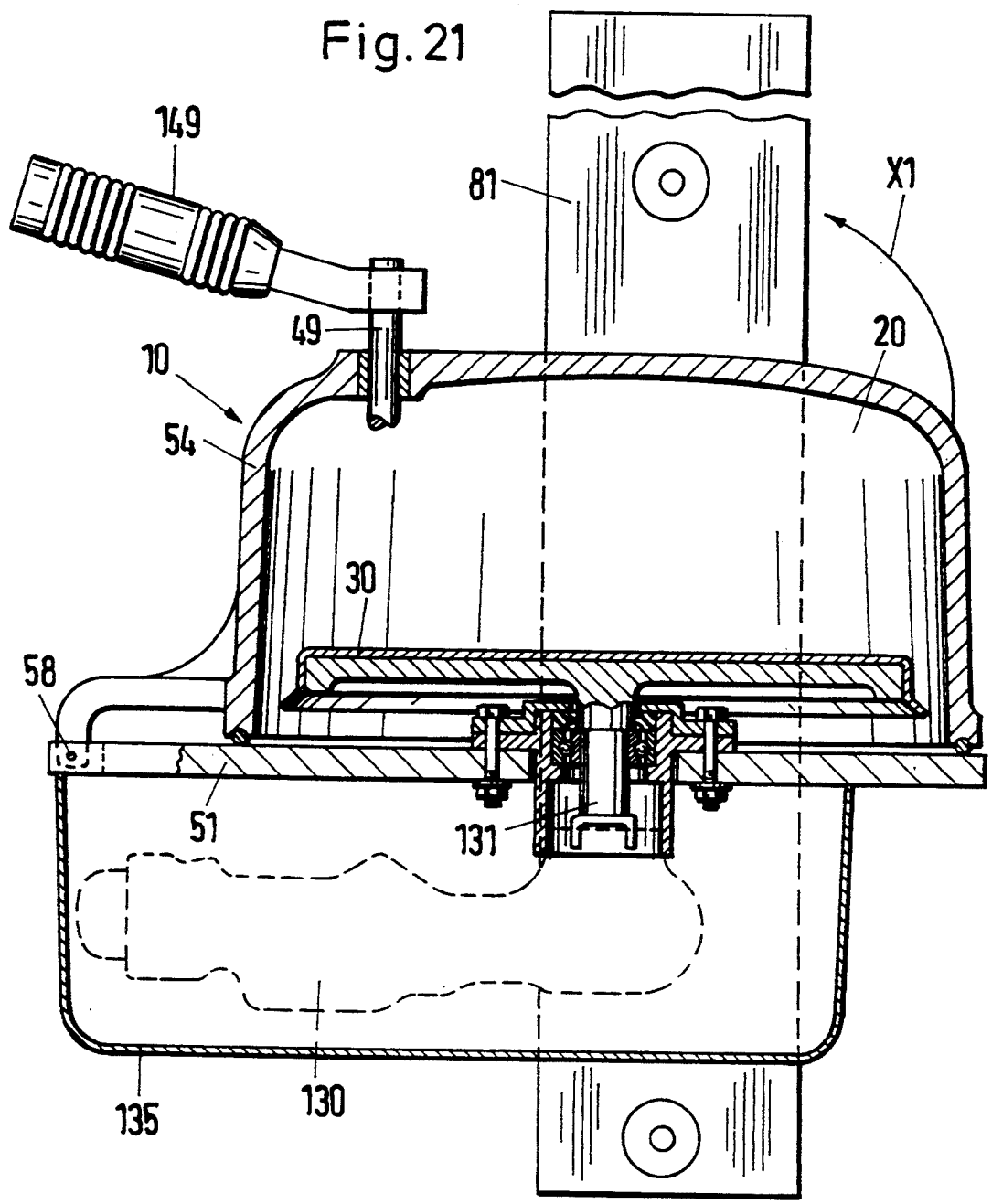
FIG. 21 shows, partly in a side view and partly in a vertical section, a further embodiment of a mixing device with a transversally disposed driving means for the mixing disk.
Figure 22:
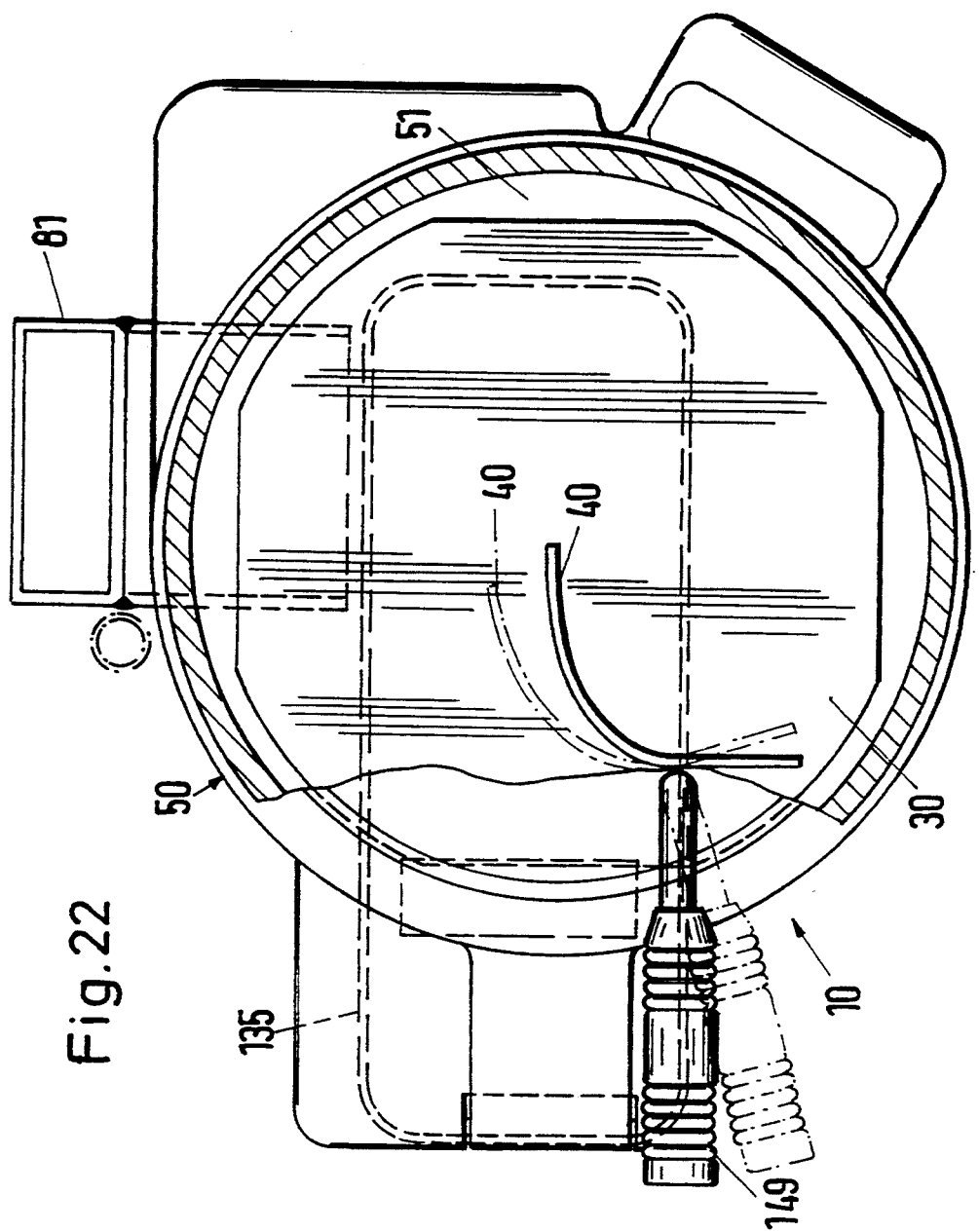
FIG. 22 shows, partly in a view from the top and partly in a horizontal section, the mixing device according to FIG. 21.

In order to provide the mixing device 10 with as small as possible dimensions and to thus provide a handy mixing unit, the driving means 130 for the mixing disk 30 is arranged so as to lie transversally to the mixing disk drive shaft 131 on a housing 135 disposed underneath the bottom portion 51. The cover portion 54 seated upon the bottom portion 51 is constructed in a hood-like fashion with a rounded-off upper rim. The mixing member 40 not shown in FIG. 21 is constructed in accordance with the embodiments described in the foregoing.

The mixing container 50 is, together with the means 80, fastened to a supporting frame 81 constructed in the form of a wall support for the metered dispensing of filler and hardener paste, while the discharge apertures 90,91 of the dispensing means 80 are disposed relative to the mixing container 50 in such a way that, when the mixing container 50 is opened, the mixing disk 30 is located underneath the discharge apertures 90,91, in which case the distance between the mixing container 50 and the dispensing means 80 corresponds to the radius of the swivel range of the cover portion 54 of the mixing container 50, or the discharge apertures 90,91 of the dispensing means 80 lie above the cover portion 54, the latter being constructed in the form of a slide.

The mixing member 40 constructed in the form of a vane does not have to be constructed so as to be swivelable about its vertical bearing shaft. There also exists the possibility of displacing the mixing member 40 relative to the mixing disk 30 in the direction of arrow Z (FIG. 3).

The mixing member 40 may be designed in the form of a support for an appropriately constructed plastic plate having a highly polished surface, in which case said plate is detachably retained, e.g. by means of clamped or snap-in connecting means, on the support. In this way, the possibility exists of effortlessly cleaning the part of the mixing member 40 which has been acted upon by the filler during the mixing operation and of replacing it if the contamination is excessive.

The means identified with 80 for the simultaneous and metered dosing of synthetic composition and hardener, such as e.g. polyester fillers and hardener pastes comprises, according to FIG. 23, a supporting structure 520 that is provided with fastening means for a connection to a vertical wall or the like. On this supporting structure 520, the mixing device 10 is likewise arranged.

Within the upper area, the supporting structure 520 is fitted with a working cylinder 521 constructed in a manner known per se, which is operable by means of compressed air, compressed gas, hydraulically, electromotively or manually. This working cylinder 521 is provided with a vertically displaceable piston rod 522, to whose end 522a, a piston plate 523 is secured.

Within the lower area of the supporting structure 520, within the moving area of the piston rod 522 of the working cylinder 521, a centering plate 530 for a can-like container 540 holding the filler is provided. Said can-like container 540, prior to it being introduced into the means 80, is closed with a cover portion 545. The bottom portion 543 of the can-like container 540 is provided with a discharge orifice 544 which, for storing the container full of filler, is sealed by a closing plug not shown in the drawing.

The centering plate 520 is arranged relative to the working cylinder 521 and its piston rod 522 in such a way that the can-like container 540 mounted on the centering plate 530 is able to receive the piston plate 523 of the piston rod 522 of the working cylinder 521 so that the piston plate 523 is longitudinally displaceable within the interior of the can-like container 540.

Figure 25:
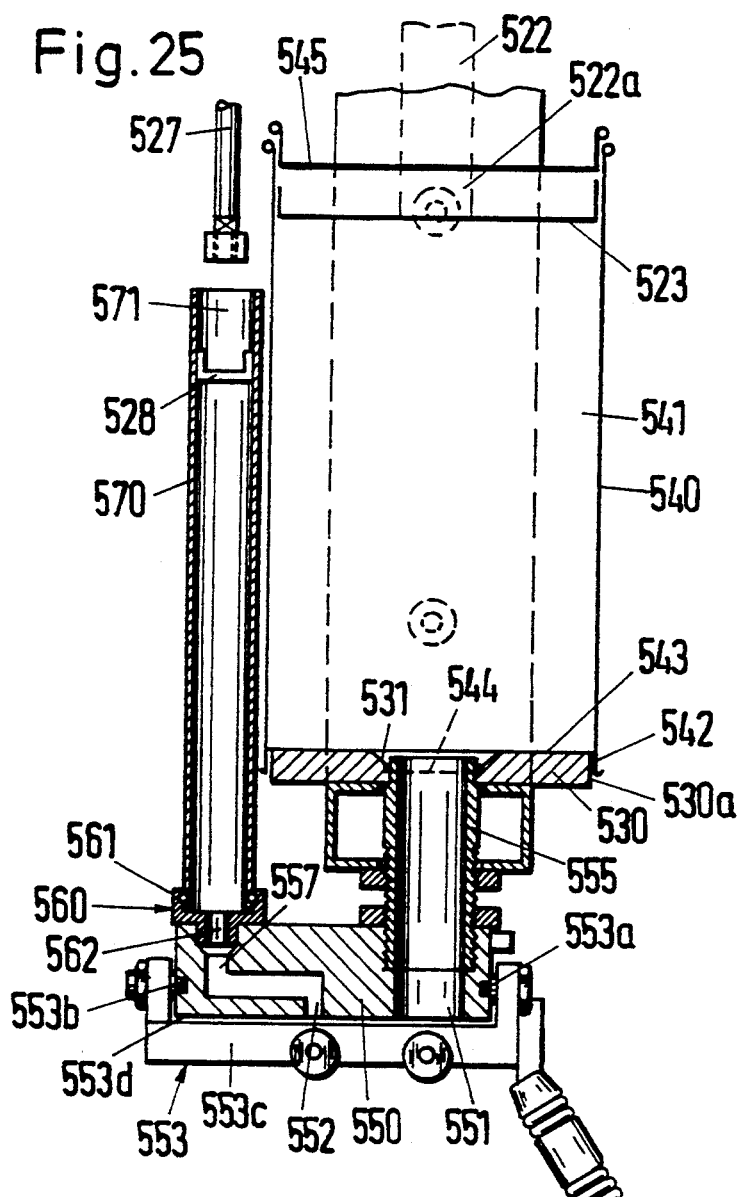
FIG. 25 shows, partly in a view and partly in a vertical section, the filling device.

The can-like container 540 is, at its bottom, provided with a circumferential rim 542 and has a cross-section and dimensions which correspond to those of the centering plate 530 so that, when the can-like container 540 is attached to the centering plate 530, its circumferential rim 42 engages over the circumferential rim 530a of the centering plate 530 with the result that the can-like container 540 is securely retained on the centering plate 530 (FIG. 25).

Figure 26:
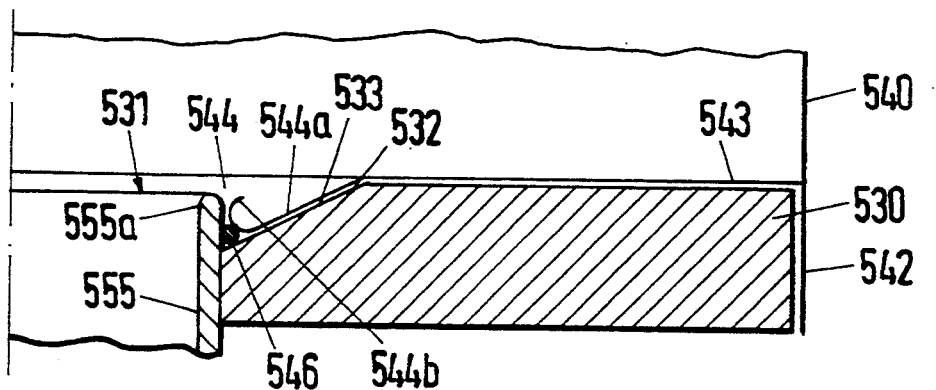
FIG. 26 shows, in a vertical partial section, the centering plate with attached can-like container for the filler.

The centering plate 530 is provided with a central bore 531 which may also be eccentrically disposed in relation to the central point of the circular centering plate 530. The upper circumferential rim 532 of this bore 531 is constructed so as to taper conically toward the center of the bore, as is depicted in FIG. 26. This conical section is identified with 533.

Underneath the centering plate 530, a filling head 550 secured to the supporting structure 520 is disposed (FIGS. 24 and 25).

This filling head 550 is provided with two dispensing apertures 551 and 552, of which dispensing aperture 551 is intended for dispensing the filler and dispensing aperture 552 for the dispensing of hardener paste. Both dispensing apertures are disposed in close side-by-side arrangement.

With the aid of a pipe connection 555, the dispensing aperture 551 for the filler communicates with the bore 531 in the centering plate 530, while the other dispensing aperture 552 for the hardener paste, via a bore 556 in the filling head 550, communicates with an inlet aperture 557 constructed in the top of the latter.

The two dispensing apertures 551 and 552 are jointly sealable by means of a closing member 553 acting in the manner of a knife blade which is of U-shape and, at 553a, is rotatably supported on the sides of the filler head 550 (FIG. 25). Said closing member 553 can be manually actuated and is swiveled with the aid of suitable driving means, the opening time being pre-programmed. On one of the lateral legs of the closing bar 553, a handle 554 is provided that is constructed in the form of a one-armed lever. The area of the filling head 550 where the dispensing apertures 551,552 are located is of circular construction so that the web 553c of the closing member 553 terminates on the circular area 553d of the filling head 550. When the closing member 553 is swiveled by means of handle 554 in the direction of arrow Z1, the two dispensing apertures 551,552 are simultaneously exposed so that the filler and the hardener paste are able to issue side by side. In FIG. 24, a strand of filler is identified with SM and a strand of hardener paste with HP. In order to prevent any filler or hardener from being able to continue to flow from the dispensing apertures 551,552 when closing member 553 is in the closed position, the two dispensing apertures 551,552 are located within the vicinity of groove-like recesses constructed in the surface 553 of filling head 550, in which sealing elements can be moved on the inside of the web 553c of the closing member 553 when the closing member 553 is actuated. As a result of this construction, a very good sealing of the dispensing apertures 551,552 is ensured in the closed position of the closing member 553 so that no further filler or hardener will be able to flow out of said dispensing apertures.

The mode of action of the thusly constructed closing member corresponds to that of a knife-like cutting means, i.e. the filler and the hardener paste strands flowing from the dispensing apertures 551,552 are properly sheared or cut off when said apertures are closed.

On the filling head 550, within the area of its inlet aperture 557 for the hardener paste, an interchange adapter 560 is provided that is attachably mounted and thus is detachably connected to the filling head 550. Said interchange adapter is provided with a mounting means 561 for accommodating a cartridge 570 for receiving the hardener paste. When in use, the cartridge 570 is open at the bottom. The cartridge 570 is provided with a removable bottom portion for storing cartridges filled with hardener paste. When the cartridge 570 is not in use, its top portion is closed by means of a cover not shown in the drawing. This cover is removed when the cartridge is mounted on the interchange adapter 560. In addition, the interchange adapter 560 is provided with a connecting opening indicated at 562, which corresponds to the upper inlet aperture 557 of the filling head so that the contents of the cartridge 570 mounted on the adapter 560 can be supplied via a connecting opening 562 and the inlet aperture 557 of the bore 556 and thus to the dispensing aperture 552 in the filling head 550.

The interchange adapter 560 is adapted to the dimensions of the respective cartridge 570 employed so that cartridges having different diameters can be mounted on the filling head 550 without difficulty by using in each case an appropriately constructed interchange adapter 560. The employment of interchange adapters 560 is advantageous since, at different external temperatures to which the means 80 is exposed, different quantities of hardener paste have to be supplied to the filler. In the event of colder outside temperatures, more hardener paste is required so that, for an appropriate dosing of hardener to the filler, cartridges have to be employed for the hardener paste which possess a larger diameter so that, concurrent with the dispensing in each case desired and required quantity of hardener paste is dispensed, for the squeezing out of filler and hardener paste from the pertinent containers into the filling head 550 for a simultaneous metered removal takes place simultaneously by means of the working cylinder 521, which will still be dealt with hereinafter.

The squeezing out of the hardener paste from the cartridge 570 mounted on the filler head 550 into the filler head is effected together with the pressing out of the filler from the can-like container 540 with the aid of the working cylinder 521. For this purpose, the piston plate 523 of the piston rod 522 of the working cylinder 521 is disposed on the free end 526a of the leg 526 of a U-shaped control member 525, the other leg 527 of which, on its free end 527a, carries a piston plate 528 which is longitudinally displaceble in the interior 571 of the cartridge 570. The construction and the disposition of the U-shaped member 525 are such that the leg 527 with the piston plate 528 of the member 525 is movable and in the longitudinal direction of the cartridge 570. The piston plate 528 need not be rigidly connected to the leg 527 of the member 525. In the embodiment depicted in FIG. 25, the free end 527a of the leg 527 of the member 525 is constructed so as to be merely reinforced, while the piston plate 528 is disposed in the interior 571 of the cartridge 570 and is displaceable in the longitudinal direction of the latter. The piston plate 528 in the interior 571 of the cartridge 570 is in this case constructed in such a way that, during the forward movement, the piston plate 528 is incapable of tilting. If the cartridge 570 is filled with hardener paste, then the piston plate 528 used is capable of simultaneously forming the upper closure of the cartridge 570. The use of a piston plate 528 which is not connected to the member 525 offers the advantage that cartridges 570 having different diameters can readily be employed since solely the piston plate already provided on the cartridge side is acted upon only by the free end 527a of the leg 527 of the member 525 when the piston rod 522 is moved downwardly by working cylinder 521. The member 525 is forcibly controlled in conjunction with the piston rod 522, i.e. when piston rod 522 is moved downwardly, the member 525 is also moved in the downward direction with the result that the materials from the container 540 and the cartridge 570 are pressed into the filling head 550 and can be removed therefrom.

The connecting piece 555 connecting the dispensing aperture 551 for the filler in the filling head 550 is conveyed as far as into the conical area 533 of the bore 531 in the centering plate 530 so that the connecting piece 555 with its upper circumferential section 555a projects into the bore 531 (FIG. 26). The discharge aperture 544 in the bottom 543 of the can-like container 540 is constructed in such a way that, subsequent to container 540 having been mounted on the centering plate 530, a leakproof connection between the connecting piece 555 and the discharge aperture 544 in the bottom 543 of the container 540 is established. The discharge aperture 544 in the bottom 543 of the container 540 is constructed in accordance with the position of the bore 531 in the centering plate and disposed in such a way that, when the container 540 is mounted on the centering plate 530, its discharge aperture 544 corresponds to the bore 531 in the centering plate 530. If the bore 531 in the centering plate 530 is disposed eccentrically in relation to the center of the plate, then the discharge aperture in the bottom 543 of the container 540 is likewise eccentrically arranged in a corresponding manner so that, in the mounted state, the container discharge aperture 544 is located opposite the bore 531 in the centering plate 530 (FIG. 25).

The circumferential marginal section 544a of the bottom 543 delimiting the discharge aperture 544 is constructed in conformity with the shape of the conical section 533 of the bore 531 in the centering plate 530 and is likewise of conical configuration so that the marginal or rim section 544a of the bottom 543 extends parallel to the conically extending section 533 of the bore 531 (FIG. 26). The free circumferential terminal edge of the conically extending circumferential marginal section 544a passes into a circular and upwardly bent rim section 544b which is constructed and arranged within the area of the discharge aperture in such a way that, when the container 540 is mounted on the centering plate 530, the upper rim section 555a of the connecting piece 555 acts upon the circular downwardly bent rim section 544b within the area of the discharge aperture 544 in such a way that a leakproof connection between the rim delimiting the discharge aperture 544 and the connecting piece 555 exists. This connection is significantly improved still further if the rim delimiting the discharge aperture 544 is fabricated from a springily resilient material or if the bottom 543 is fabricated from a springily resilient material so that the circumferential rim 544a delimiting the discharge aperture 544 is then subject to a certain initial stress. An enhanced sealing may additionally be achieved when, as depicted in FIG. 26, a sealing ring 546 is inserted which engages externally around the connecting piece 555 within the area of its upper section 555a and when the container 540 mounted on the centering plate 530 is subject to the action of the circumferential rim 344a of the discharge aperture 544.

The can-like container 540 is constructed in such a way that, as is shown in FIGS. 25 and 26, it is retained securely on the centering plate 530. The piston plate 523 secured to the piston rod 522, so far as configuration and dimensions are concerned, corresponds to those of the container 540 so that a complete evacuation of the container 540 down to the last remainder is possible.

The simultaneous dispensing of filler and hardener paste with the aid of this apparatus is effected in such a way that, subsequent to the working cylinder 521 having been put into operation, e.g. by supplying compressed air to it. It is possible to draw in each case desired quantities of filler and hardener paste by the appropriate actuation of the closing member 553. Owing to the fact that both piston plates 523 and 528 are simultaneously actuated by the working cylinder 521, a simultaneous squeezing out of the materials from the containers 540 and 570 takes place so that, when the closing member 553 is opened, filler and hardening paste flow from the two dispensing apertures 551 and 552 of the filling head 550 direct into the opened mixing container of the device 10. Due to the circumstance that both dispensing apertures 551,552 of the filling head 550 are disposed in a close side-by-side arrangement, the drawn-off quantity of filler and the simultaneously drawn-off quantity of hardener paste are deposited closely next to each other on the mixing disk of the device 10 located underneath the dispensing apertures 551,552, which is of advantage for an intimate intermixing of both pastes. Thus no great distances will have to be covered for the intermixing of the two components as has otherwise been necessary up until now in accordance with the conventional methods.

Nor is it necessary for the piston plate 528 to be rigidly connected to the piston rod 522; the possibility of disposing the piston plate 523 from the outset in the interior of the container 540 so that it is acted upon by the piston rod 522 of the working cylinder 521 solely for the pressing out operation. In lieu of a single adapter 560, two or more adapters can be mounted on the filling head 550 for receiving cartridges 570 possessing different diameters. The adapters are then combined e.g. on a sliding support which is displaceably mounted on the filling head 550 in such a way that the connecting opening 562 of each adapter 560 is displaceable into the area of the inlet aperture 557.

With the means 80, a simultaneous and metered, highly satisfactory drawing off of filler and hardener paste onto the mixing disk of the device 10 is ensured. Both the filler as well as the hardener paste are dispensed closely next to each other onto the mixing disk, which has a particularly advantageous effect on the intermixing of the filler with the hardener paste following thereupon. Furthermore, with the means 80, clean materials in perfect condition can be drawn off without any encrusted filler particles or other contaminants and obtained in the process which, as is well-known to the chagrin of the paint shop worker, result in the formation scores during the application of the filler. It is thus possible to readily draw off large and small quantities while dosing the hardener paste accurately percentagewise. Overdosing is impossible and, with it, a possible seeping through in spray-painted areas. The utilization of an interchange adapter for accommodating the cartridge for the hardener paste is particularly advantageous. For, if during winter, more hardener is required, then adapter and piston of the hardener rods as well as the hardener cartridges are simply exchanged for units having a larger diameter which are again adapted exactly to each other. The filling head employed in the device ensures a leakproof sealing of the dispensing apertures for the filler and the hardener paste subsequent to the effected removal so that an encrustation or hardening of remainders of these materials is avoided. It is advantageous, furthermore, that the containers are emptied down to the last vestiges. The container for the filler is securely retained on the centering plate and is at all times so disposed that its bottom outlet aperture coincides with the bore in the centering plate, which, in turn, communicates with the dispensing aperture in the filling head. The special and reciprocally adapted constructions of the bore in the centering plate and of the bottom outlet aperture in the can-like container ensure a leakproof sealing when the container for the filler is disposed on the centering plate. The circumferential rim of the container for the filler engages laterally over the centering plate so that a firm seating of the container in the dispensing means 80 is ensured.

When a can-like container is emptied, then merely a new, full container is introduced into the means 80 and the contents of the container can be dispensed with the aid of the working cylinder and by means of the filling head in the quantity required in each particular case. Owing to the fact that the container for the filler is adapted to the construction of the means, it is only possible to use for the means 80 the containers especially designed for the same.

If parts of the mixing device are pneumatically, electromotively, hydraulically or electromagnetically driven, then these parts are combined in a control unit, by means of which all operational sequences are controlled in a predetermined sesquence. Also the filler/hardener dispensing means 80 is driven pneumatically, electromotively, hydraulically or electromagnetically; its control is likewise effected by means of the overall control unit so that the following sequence of operations is ensured:

Opening of the dispensing means 80 for a predetermined time interval in dependence of the quantity of components to be intermixed;

Disruption of the filler and hardener supply onto the mixing disk of the mixing device with open mixing container;

Build-up of the requisite vacuum and simultaneous rendering operative of the mixing disk with simultaneous execution of the swivel movement of the mixing member;

Switching off the vacuum generating unit, ventilation of the mixing container interior and rendering the mixing disk inoperative;

Opening the cover portion for removing the mixing disk with the workable filler.

What is claimed is:

1. A device for producing medium-viscous and highly-viscous dual and multiple component compounds by intermixing of components, said device comprising:

a mixing container including a bottom portion and a circumferential side wall, said side wall and said bottom portion together defining a mixing chamber;

a cover portion for closing said mixing chamber during operation of said device;

means for attaching said cover portion to said circumferential side wall;

a horizontal mixing disc disposed in said mixing chamber for supporting intermixing components thereon and rotatably and detachably supported on said bottom portion;

means attached to said bottom portion for directly rotating said mixing disc about a central axis of said device;

a mixing member located in said mixing chamber above said mixing disc, said mixing member including means to prevent a full circular rotation of said mixing member, wherein said mixing member is formed as a boundary vertical wall, having an opening facing in a direction opposite to a direction of rotation of said mixing disc and defining a mixing space; and vacuum generating means communicating with said mixing chamber for eliminating air bubbles in a producible compound.

2. The device of claim 1, wherein said vertical wall is rectangular.

3. The device of claim 2, wherein said vertical wall has an inner surface defining said opening and wherein said mixing member is supported in said mixing chamber relative to said mixing disc, so that, during rotation of said mixing disc, particles of the producible compound carried by said mixing disc impinge on said inner surface at a right angle.

4. The device of claim 2, wherein said vertical wall has an inner surface defining said opening and wherein said mixing member is supported in said mixing chamber relative to said mixing disc so that during rotation of said mixing disc particles of a producible compound carried by said mixing disc impinge on said inner surface at an angle less than 90°.

5. The device of claim 1, wherein said vertical wall is circular.

6. The device of claim 5, wherein said vertical wall has an inner surface defining said opening and wherein said mixing member is supported in said mixing chamber relative to said mixing disc so that during rotation of said mixing disc particles of a producible compound carried by said mixing disc impinge on said inner surface at an angular area between an angle of 30° to 90°.

7. The device of claim 6, wherein said angular area extends from outside to inside from 55° to 45°.

8. The device of claim 1, further comprising means for effecting an alternate swivel motion of said mixing member to provide for rolling and sliding motion of a body of the producible compound.

9. The device of claim 8, wherein said effecting means comprises a swivel shaft extending through said cover portion for supporting said swivel member, and drive means for driving said swivel shaft.

10. The device of claim 9, wherein said mixing member is arranged eccentrically relative to said cover portion.

11. The device of claim 9, wherein said mixing member is swivelled a predetermined angle about an axis of said swivel shaft between a first position, in which an inner edge of said vertical wall substantially coincides with a center of said mixing disc, and a second position, in which said inner edge is spaced from the center of said mixing disc.

12. The device of claim 1, further comprising a cover disposed over said opening of said mixing member from above.

13. The device of claim 1, wherein said mixing member is made of a plastic material.

14. The device of claim 1, wherein said mixing member is made of a metallic material.

15. The device of claim 1, wherein said mixing member is made of a metallic material covered with a plastic material.

16. The device of claim 1, wherein said cover portion has an open position, in which components may be delivered into said mixing chamber and the producible compound may be removed, and a closing position, to close said mixing chamber, said device further comprising means for automatically moving said cover portion into at least one of the open and closed positions thereof.

17. The device of claim 16, wherein said moving means comprises a tension spring.

18. The device of claim 16, wherein said moving means comprises a pneumatic spring.

19. The device of claim 16, wherein said moving means comprises a hydraulic cylinder.

20. The device of claim 1, wherein said side wall has an upper circumferential edge, said cover portion being attached to said circumferential edge.

21. The device of claim 1, wherein said vertical wall has spaced inner edges defining an open side of said opening, said open side having a length not exceeding the radius of said mixing disc.

22. The device of claim 1, wherein said mixing disc is formed as a circular disc.

23. The device of claim 1, wherein a clearance is provided between said mixing disc and a bottom edge of said vertical wall for enabling an unimpeded rotation of said mixing disc.

24. The device of claim 23, wherein said bottom edge is formed as a knife blade.

25. The device of claim 1, further comprising:
means for dispensing components of which a compound is made; and
a frame for supporting said mixing container and said dispensing means.

26. The device of claim 25, wherein said dispensing means, comprises:
a can-like container containing one component for forming the compound;
a circular centering plate for supporting said can-like container;
container means containing another component for forming the compound and supported on said supporting frame;
a working cylinder supported on said supporting frame for delivering components from said can-like container and said container means and including a piston rod, a piston plate supported at an end of said piston rod and means for displacing said piston rod together with said piston plate; and
a filling head located beneath said centering plate and having two apertures disposed in a side-by-side arrangement and communicating with said can-like container, said container means and said mixing container for delivering components from said can-like container and container means into said mixing container.

27. The device of claim 26, wherein said dispensing means further comprise a U-shaped stirrup, said piston plate of said working cylinder being secured to one leg of said U-shaped stirrup, a plate secured to another leg of said U-shaped stirrup and displaceable in an interior of said container means for delivering the another component.

28. The device of claim 26, wherein said dispensing means comprises a member attached to said filling head for closing said apertures and a handle for moving said closing member between open and closing positions thereof.

29. The device of claim 25, wherein said centering plate has a circumferential edge, and said can-like container has a bottom portion having a circumferential edge engaging the circumferential edge of said centering plate from outside.

* * * * *